(12) United States Patent
Yanaka

(10) Patent No.: US 6,966,397 B2
(45) Date of Patent: Nov. 22, 2005

(54) DEVICE AND METHOD FOR OPERATING A VEHICLE

(75) Inventor: Akihiro Yanaka, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 92 days.

(21) Appl. No.: 10/283,172

(22) Filed: Oct. 30, 2002

(65) Prior Publication Data

US 2003/0098196 A1 May 29, 2003

(30) Foreign Application Priority Data

Nov. 29, 2001 (JP) .............................. 2001-363688
Jul. 26, 2002 (JP) .............................. 2002-218542

(51) Int. Cl.[7] ........................ B60K 26/02; B62D 1/12; B62D 5/04; G05G 5/05; G05G 9/047
(52) U.S. Cl. ...................... 180/315; 180/333; 180/402; 74/471 XY; 701/36
(58) Field of Search ................................. 180/315, 333, 180/402, 444, 446; 701/41, 48, 70, 36; 74/471 XY; 345/161

(56) References Cited

U.S. PATENT DOCUMENTS 5,589,854 A * 12/1996 Tsai ............................. 345/161
6,082,482 A * 7/2000 Kato et al. ................... 180/402
6,213,248 B1 4/2001 Kawaguchi et al.
6,634,454 B2 * 10/2003 Sugitani et al. ............. 180/333

FOREIGN PATENT DOCUMENTS

| EP | 0 854 075 A2 | 7/1998 | |
|---|---|---|---|
| EP | 1 052 161 A2 | 11/2000 | |
| EP | 1 088 739 A2 | 4/2001 | |
| EP | 1 127 775 A1 | 8/2001 | |
| JP | A 8-34353 | 2/1996 | |
| JP | A 10-203393 | 8/1998 | |
| JP | A 10-236326 | 9/1998 | |
| JP | A 10-329742 | 12/1998 | |
| JP | 11192960 A * | 7/1999 | ............ B62D 6/00 |
| JP | A 2000-118426 | 4/2000 | |
| JP | A 2000-318587 | 11/2000 | |
| JP | A 2001-233232 | 8/2001 | |

* cited by examiner

Primary Examiner—Peter C. English
(74) Attorney, Agent, or Firm—Oliff & Berridge, PLC

(57) ABSTRACT

A device for operating a vehicle is provided with an operating lever to be operated by a driver, operating position sensors that detect a displacement amount of the operating lever, reaction force generating mechanisms that generate a return force and a reaction force in the operating lever, and a microcomputer that controls the reaction force generating mechanisms. The return force and the reaction force can be controlled independently. Also, the reaction force is generated by the reaction force generating mechanisms after the operating lever has reached an initial position. Further, a torsion spring is provided that retains the operating lever in the initial position when electric power is interrupted.

14 Claims, 14 Drawing Sheets

DEVICE AND METHOD FOR OPERATING A VEHICLE

BACKGROUND OF THE INVENTION

1. Field of Invention

The invention relates to a device and a method for operating a vehicle, in which a return force and a reaction force are applied to an operating member. The operating member is provided so as be able to be displaced with respect to the vehicle and is operated by a driver. The return force and reaction force move the operating member to an initial position according to a state and operation thereof.

2. Description of Related Art

A device for operating a vehicle has been known in which a reaction force in accordance with an operation amount of a joystick operated by a driver is generated by a reaction force load device that is provided with an electric motor. This reaction force is applied to the joystick so as to stabilize the operation of the joystick by the driver. One such device is disclosed in Japanese Patent Laid-Open Publication No. 8-34353. With this kind of device for operating a vehicle using a joystick, the joystick is retained in an initial position by the reaction force from the reaction force load device when the electric power supply is ON and the driver is not operating the joystick, for example. When the electric power supply is OFF, the joystick is able to rotate freely when the electric motor of the reaction force load device is stopped. As a result, no load is applied to the joystick so it tilts in a given direction by its own weight.

When the joystick that is tilted because the electric power supply is OFF is up-righted to the initial position when the electric power supply is turned ON, however, it is possible that, if the joystick is moved to the initial position with a large force and collides with an object or a part of the driver's body, for example, it may apply a large load on the object or part of the driver's body.

SUMMARY OF THE INVENTION

It is an object of the invention to provide a device and a method for operating a vehicle, in which a large load is not applied to the driver or the like by movement of an operating member such as a joystick to an initial position.

According to a first aspect of the invention, a device for operating a vehicle is provided with an operating member to be operated by a driver, a position detector that detects a displacement position of the operating member, and a reaction force generator that generates a return force that moves the operating member to an initial position and a reaction force against the operating member in accordance with the displacement position of the operating member. The device for operating a vehicle is also provided with a reaction force controller that independently controls the return force and the reaction force that are generated by the reaction force generator.

According to the device for operating a vehicle according to the first aspect of the invention, because the return force and the reaction force can be controlled separately, the return force generated when the operating member is returned to the initial position and the reaction force generated when the vehicle is operated are both able to be set to a preferable amount. For example, it is preferable to set the reaction force large enough to sufficiently ensure safety when the driver operates the operating member, and so as to be small when the operating member is in a position near a neutral position and increase as the operating member is moved away from the neutral position. Also, it is preferable to set the return force small regardless of the position of the operating member.

Accordingly, in this case, it is preferable to control the return force so that it is less than the reaction force. As a result, even if an object or a part of the driver's body such as a hand contacts the operating member, it is possible to prevent a strong force from being generated so a large load is not applied to the driver or the object, thereby increasing safety.

According to a second aspect of the invention, a device for operating a vehicle is provided with an operating member to be operated by a driver, a reaction force generator generates a reaction force against the operating member, and a reaction force generating controller that allows generation of the reaction force by the reaction force generator after the operating member has substantially reached an initial position. Accordingly, the reaction force is not generated until the operating member moves to the initial position, so a load from the reaction force of the operating member is not applied to the driver or the like until the driver has moved the operating member to the initial position.

According to a third aspect of the invention, a device for operating a vehicle is provided with an operating member to be operated by a driver for steering the vehicle in accordance with an operating position thereof, a reaction force generator that generates a reaction force against the operating member with a supply of electric power, and a device that brings a corresponding relationship between a position of the operating member and a steering angle of a wheel into agreement when the supply of electric power is interrupted. Accordingly, because the relationship between the position of the operating member and the steering angle of the wheel is brought into agreement when the supply of electric power is interrupted, an operation for matching the position of the operating member with the wheel when electric power starts to be supplied to the vehicle becomes unnecessary. Therefore, the operating member no longer moves until the vehicle starts to be operated by the operating member, thereby solving the problem caused by the operating member moving when electric power starts to be supplied. The time that the electric power is interrupted in this case includes not only the point at which the electric power is interrupted, but also the period during which the electric power is interrupted.

According to a fourth aspect of the invention, a device for operating a vehicle is provided with an operating member to be operated by a driver for steering a vehicle in accordance with an operating position thereof, a reaction force generator that generates a reaction force against the operating member with a supply of electric power, and a device that positions the operating member and a wheel in an initial position when the supply of electric power is interrupted. The initial position in this case is a neutral position for the operating member, and at the same time, it is a position in which the steering angle of the wheels is "0". Accordingly, because the operating member is retained in the initial position when the supply of electric power is interrupted, it is possible to start the vehicle quickly. Also, because it is no longer necessary to move the operating member before starting to operate the vehicle by the operating member, the problem caused by the operating member moving when starting to supply electric power is solved. In this case as well, the time that the electric power is interrupted includes not only the point at which the electric power is interrupted, but also the period during which the electric power is interrupted.

According to a fifth aspect of the invention, a device for operating a vehicle is provided with an operating member to be operated by a driver, a position detector that detects a displacement position of the operating member, a reaction force generator for generating a reaction force against the operating member in accordance with the displacement position of the operating member detected by the position detector, a determining device that determines whether the operating member is being moved to substantially an initial position after electric power starts to be supplied, and a reaction force control mode changing device that changes a control mode of the reaction force generator in accordance with a determination result of the determining device.

Accordingly, for the period during which the operating member is moving toward the initial position after electric power has started to be supplied, the control mode can also be such that the reaction force generator generates a smaller reaction force than the reaction force during a period other than the concerned period, for example. Therefore, even if the operating member collides with the driver or the like, it is possible to prevent a large load from being applied. In this case, "substantially an initial position" includes not only the initial position, but also the vicinity of the initial position, which is a region in which the force generated by the reaction force generator is low so that a large load will not be applied to a hand or the like even if the reaction force is applied to the operating member by the reaction force generator.

According to a sixth aspect of the invention, a device for operating a vehicle is provided with an operating member to be operated by a driver, a position detector that detects a displacement position of the operating member, a reaction force generator that generates a reaction force against the operating member in accordance with the displacement position of the operating member detected by the position detector, and a moving speed limiting device that limits a speed of movement of the operating member resulting from the reaction force while the operating member is being moved to substantially an initial position after electric power starts to be supplied. Accordingly, because the moving speed of the operating member is limited while the operating member is moving toward the initial position, the moving speed of the operating member does not increase until the operating member substantially reaches the initial position so that even if the operating member collides with the driver or the like, a large load will not be applied.

According to a seventh aspect of the invention, a device for operating a vehicle is provided with an operating member to be operated by a driver, a returning device that moves the operating member to an initial position, and a reaction force generator that generates a reaction force against the operating member. The returning device and the reaction force generator each control the operating member independently. Accordingly, because the control of the returning device and the reaction force generator can each be performed independently, even if the operating member collides with the driver or the like, it is possible to prevent a large load from being applied by reducing the return force applied to the operating member by the return device, for example.

All above discussed aspects thus are based on the following common concept: In order to avoid any uncontrolled movement of an operating member on which a return force and a reaction force act, the control of the reaction force is such that the full reaction force act on the operating member only after a controlled movement of the operating member into an initial position.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS (First Embodiment)

Figure 1:
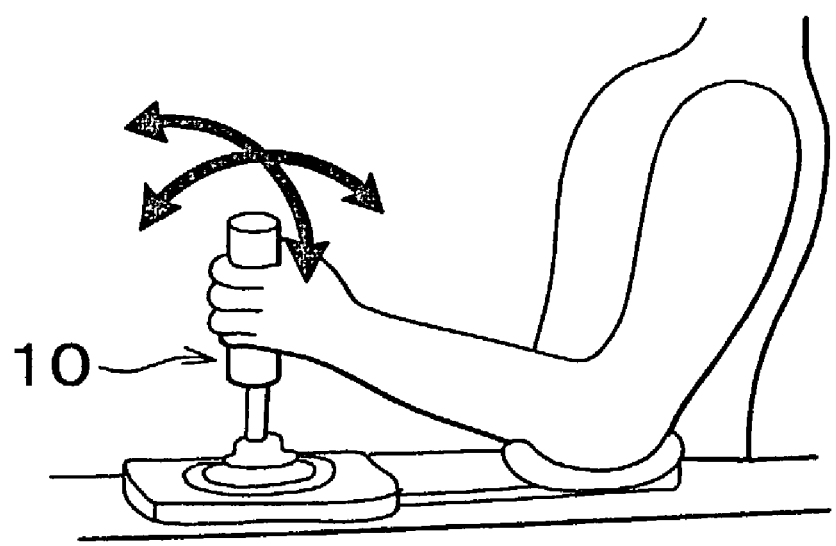
FIG. 1 is a perspective view schematically showing an operating lever of a device for operating a vehicle according to one exemplary embodiment of the invention.

Hereinafter, a first exemplary embodiment of a device for operating a vehicle according to the invention will be described with reference to the accompanying drawings. This device for operating a vehicle is provided with an operating lever (i.e., a joystick) 10 as an operating member, shown in FIG. 1. This operating lever 10 is disposed near the driver's seat in the vehicle and is able to be tilted (rotated) as a whole unit in a forward-backward direction and a left-right direction by the driver, as shown by the arrows in FIG. 1.

Figure 2:
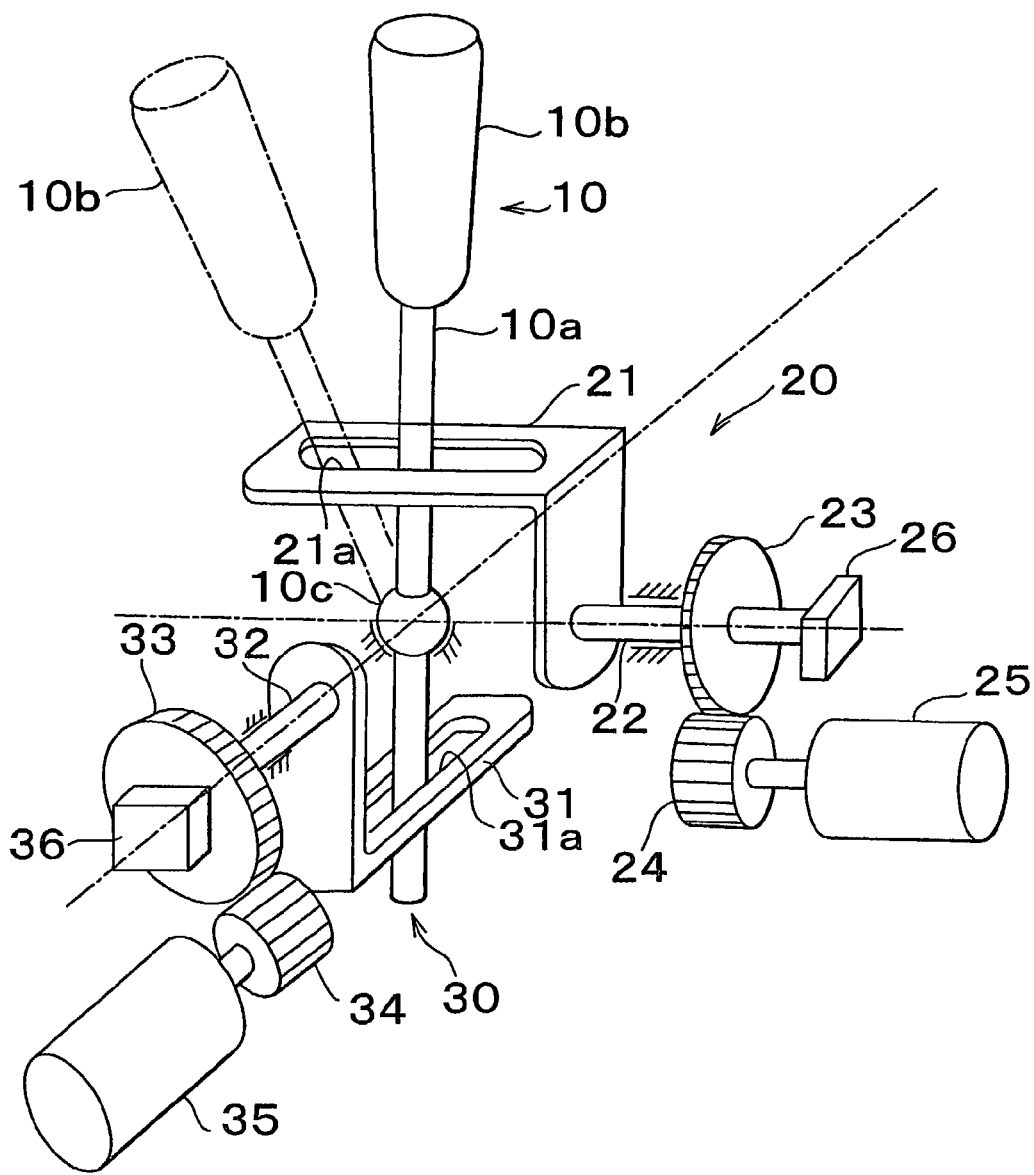
FIG. 2 is a perspective view schematically showing an operating lever device including the operating lever shown in FIG. 1.

FIG. 2 is a perspective view schematically showing an operating lever device which includes the operating lever 10. The operating lever 10 includes a cylindrical rod 10a and a cylindrical gripping portion 10b that is fixed to the outer periphery of an upper portion of the rod 10a. At approximately the center portion of the rod 10a there is a ball shaped portion 10c. The rod 10a is rotatably supported by this ball shaped portion 10c in the left-right and forward-backward directions with respect to the vehicle body.

Further, the operating lever device also includes a left-right reaction force generating mechanism 20. When starting the vehicle, this left-right reaction force generating mechanism 20 generates a return force (i.e., a force in the left-right direction with respect to the vehicle among forces that move the operating lever 10 from a position shown by the chain line in FIG. 2 to a position shown by the solid line in the same figure) in the left-right direction with respect to the vehicle from among return forces automatically controlling the operating lever 10 to an initial position. In addition, when driving the vehicle, the left-right reaction force generating mechanism 20 generates a reaction force (i.e., an opposing force against the operating force applied by the driver as the driver attempts to rotate the operating lever 10 in the left-right direction of the vehicle from the neutral position) against the rotation of the operating lever 10 in the left-right direction with respect to the vehicle. This left-right reaction force generating mechanism 20 is provided with a guide plate 21, a rotation shaft 22, a first gear 23, a second gear 24, an electric motor 25 for applying left-right reaction force, and an operating position sensor 26 as position detecting means.

The guide plate 21 is a plate-shaped member that is curved into an L shape. One face of the guide plate 21 lies in a vertical plane. To this face is fixed one end of the rotation shaft 22. The other face of the guide plate 21 lies in a horizontal plane. In this face is provided a groove 21a which has a width somewhat larger than the diameter of the rod 10a and which extends lengthwise in the forward-backward direction with respect to the vehicle. The rod 10a sticks through this groove 21a. The rotation shaft 22 is rotatably supported with respect to the vehicle body such that the axial line of the rotation shaft 22 lies in the forward-backward direction of the vehicle and runs through the center of the ball shaped portion 10c of the operating lever 10. Integrally provided on a center portion of the rotation shaft 22 is the first gear 23, which is meshed with the second gear 24 that is fixed to a rotation shaft of the electric motor electric motor 25.

The operating position sensor 26 is fixed to the vehicle body at a location corresponding to the other end of the rotation shaft 22. The operating position sensor 26 detects a rotation angle of the rotation shaft 22 as an operating position of the operating lever 10 in the left-right direction. The value of the operating position, which is an output of the operating position sensor 26, is adjusted to be "0" when the operating lever 10 is in the neutral position in the right-left direction.

Further, the operating lever device also includes a forward-backward reaction force generating mechanism 30. When starting the vehicle, this forward-backward reaction force generating mechanism 30 generates a return force (i.e., a force in the forward-backward direction of the vehicle among forces moving the operating lever 10 from the position shown by the chain line in FIG. 2 to the position shown by the solid line in the same figure) in the forward-backward direction with respect to the vehicle from among return forces automatically controlling the operating lever 10 to the initial position. In addition, when driving the vehicle, the forward-backward reaction force generating mechanism 30 also generates a reaction force (i.e., an opposing force against the operating force applied by the driver as the driver attempts to tilt the operating lever 10 in the forward-backward direction of the vehicle from the neutral position) against the tilt of the operating lever 10 in the forward-backward direction with respect to the vehicle. This forward-backward reaction force generating mechanism 30 is provided with a guide plate 31, a rotation shaft 32, a third gear 33, a fourth gear 34, an electric motor 35 for applying forward and backward reaction force, and an operating position sensor 36 as position detecting means.

The guide plate 31 is a plate-shaped member that is curved into an L shape. One face of the guide plate 31 lies in a vertical plane. To this face is fixed one end of the rotation shaft 32. The other face of the guide plate 31 lies in a horizontal plane. In this face is provided a groove 31a which has a width somewhat larger than the diameter of the rod 10a and which extends lengthwise in the left-right direction with respect to the vehicle. The rod 10a sticks through this groove 31a. The rotation shaft 32 is rotatably supported with respect to the vehicle body such that its axial line lies in the left-right direction of the vehicle and runs through the center of the ball shaped portion 10c of the operating lever 10. Integrally provided on a center portion of the rotation shaft 32 is the third gear 33, which is meshed with the fourth gear 34 that is fixed to a rotation shaft of the electric motor 35.

A operating position sensor 36 is fixed to the vehicle body at a location corresponding to the other end of the rotation shaft 32. The operating position sensor 36 detects a rotation angle of the rotation shaft 22 as an operating position of the operating lever 10 in the forward-backward direction. The value of the operating position, which is an output of the operating position sensor 36, is adjusted to be "0" when the operating lever 10 is in the neutral position in the forward-backward direction. Both the operating position sensor 26 and the operating position sensor 36 may be of the same type. The operating position sensors 26 and 36 may also convert a rotation of the rotation shafts 22 and 32 into linear movement and detect an amount of linear movement after conversion as the operating position. Further, the operating position sensors 26 and 36 may detect a change in rotation angle of a member other than the left-right reaction force generating mechanism 20 or the forward-backward reaction force generating mechanism 30 which moves with the rotation of the rotation shafts 22 and 32 as the operating position. Also, the reaction force generating means in this invention is formed by the left-right reaction force generating mechanism 20 and the forward-backward reaction force generating mechanism 30.

Figure 3:
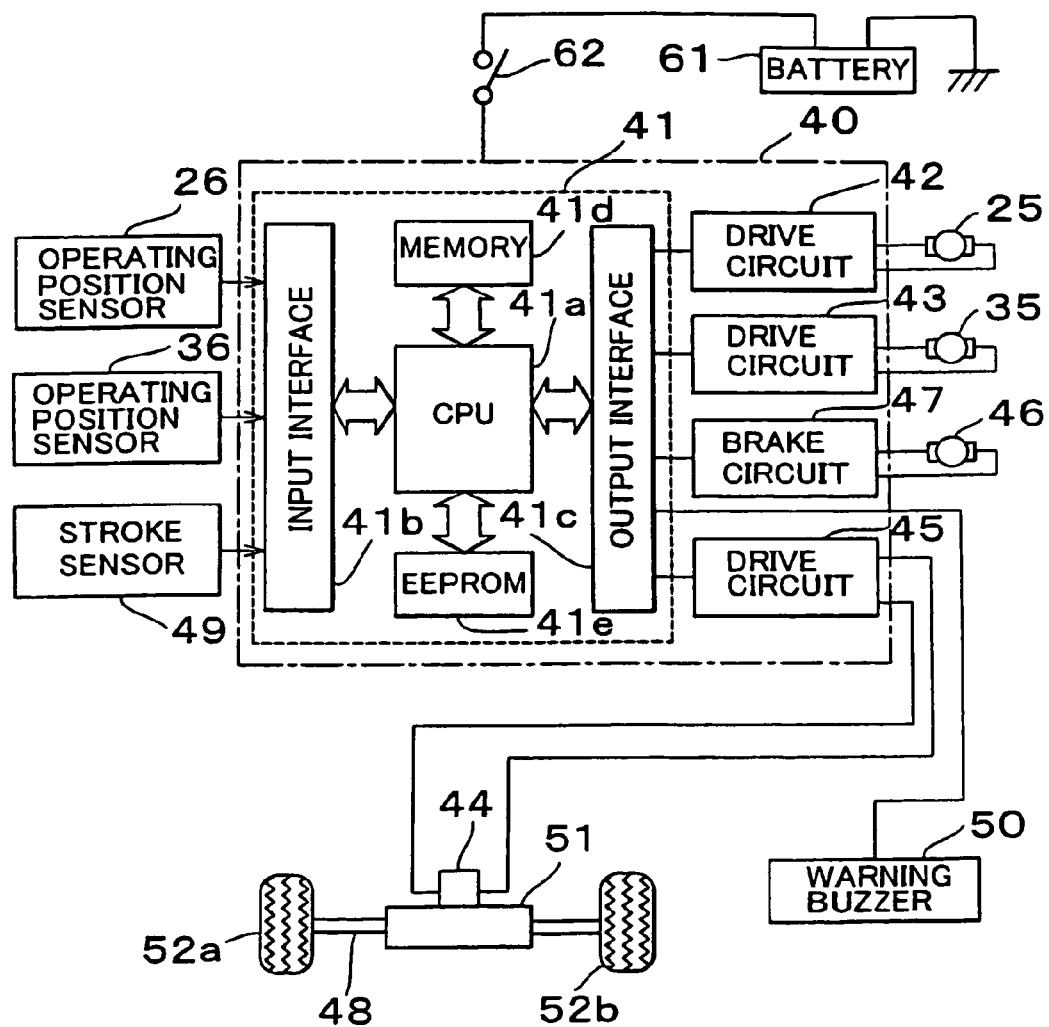
FIG. 3 is a block view showing an electrical control module of the device for operating a vehicle according to one exemplary embodiment of the invention.

Next, an electronic control module of the device for operating a vehicle will be described with reference to FIG. 3. The electronic control module 40 is provided with a microcomputer 41, a drive circuit 42 for running a predetermined current to the electric motor 25, a drive circuit 43 for running a predetermined current to the electric motor 35, a drive circuit 45 for running a predetermined current to an electric motor 44 for steering, and a brake circuit 47 for running a predetermined current to an electric motor 46 for braking.

The microcomputer 41 includes a CPU 41a, an input interface 41b, an output interface 41c, memory 41d, and EEPROM 41e. The input interface 41b is connected to the CPU 41a via a bus, as well as to the operating position sensors 26 and 36 and a stroke sensor 49 that detects a displacement amount of a steering shaft 48, and supplies detection values from each of these sensors to the CPU 41*a*. The output interface 41*c* is also connected to the CPU 41*a* via a bus, as well as to the drive sensors 42, 43, and 45, the brake circuit 47, and a warning buzzer 50, and sends signals that change the states of the drive sensors 42, 43, and 45, the brake circuit 47, and the warning buzzer 50 based on a command from the CPU 41*a*.

The memory 41*d* is formed of ROM that stores programs and map data and the like, and RAM that temporarily stores calculation values when a program is executed by the CPU 41*a*. The EEPROM 41*e*, which is also connected to the CPU 41*a* via a bus, serves as storing means for storing data even when electric power is not being supplied from a battery 61. When electric power is being supplied, the EEPROM 41*e* stores data supplied from the CPU 41*a*, as well as supplies the CPU 41*a* with stored data as requested by the CPU 41*a*.

The drive circuit 42 is provided with four switching elements, not shown. The drive circuit 42 selectively puts the switching elements into a conduction state so as to run a predetermined current to the electric motor 25 in accordance with a command from the CPU 41*a* sent via the output interface 41*c*. As a result, the electric motor 25 rotates in one direction or the other so as to generate a predetermined return force or reaction force in the operating lever 10. The drive circuit 43 is also similar in construction to the drive circuit 42, and runs a predetermined current to the electric motor 35 in accordance with a command from the CPU 41*a* sent via the output interface 41*c*.

Moreover, the drive circuit 45 is similar in construction to the drive circuits 42 and 43, and runs a predetermined current to the electric motor 44 for steering in accordance with a command from the CPU 41*a* sent via the output interface 41*c*. As a result, when the electric motor 44 for steering is driven, a steering mechanism 51 is actuated so that a predetermined steering angle of steered wheels 52*a* and 52*b* is achieved. The brake circuit 47 controls the electric motor 46 for braking so as to apply a braking force to the vehicle. Further, the warning buzzer 50 warns the driver when an abnormality has occurred in the movement of the operating lever 10.

The battery 61 is connected to the electronic control module 40 via an ignition switch 62. When the ignition switch 62 is ON, electric power is supplied to each of the circuits within the electronic control module 40.

Figure 4:
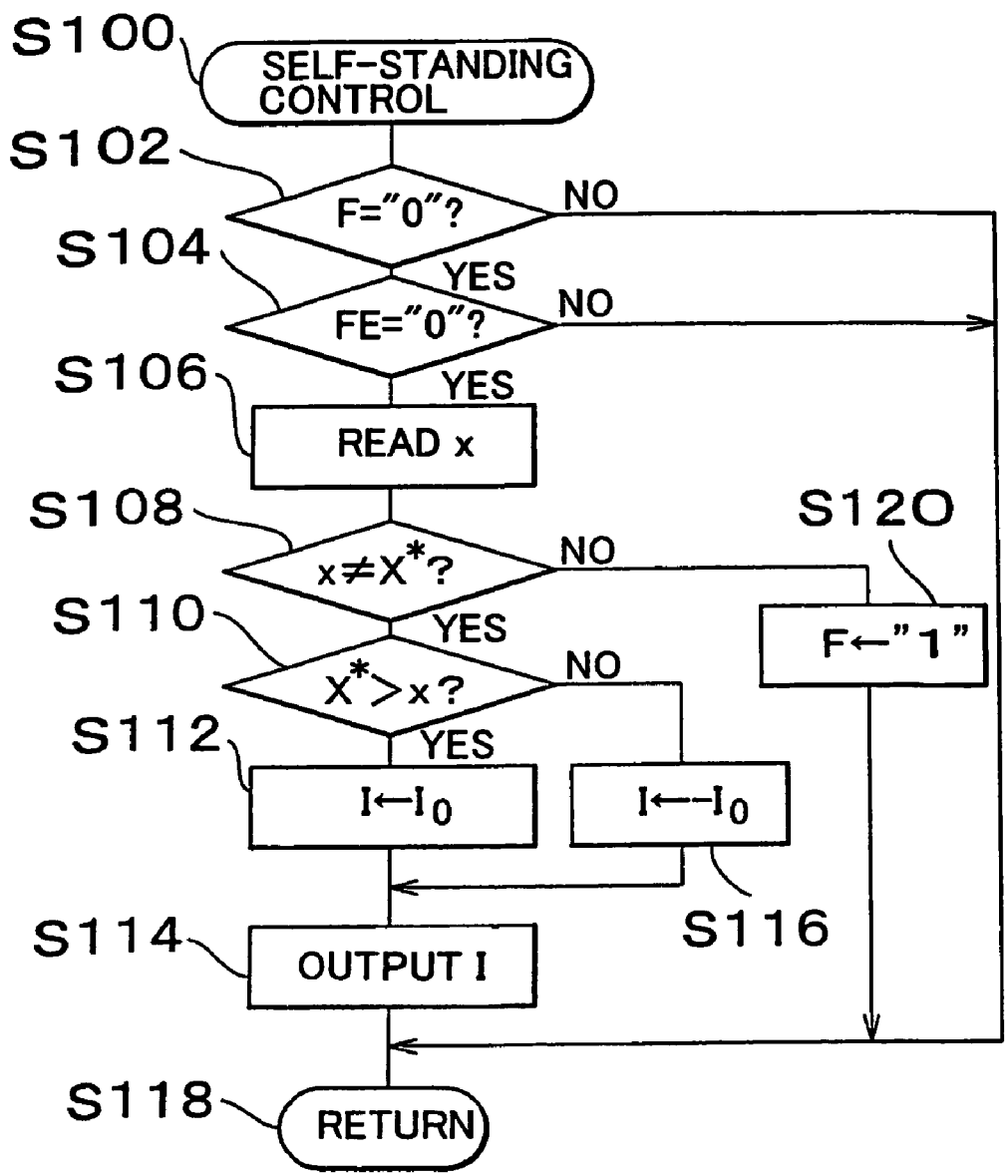
FIG. 4 is a flowchart showing a self-standing control executed by a CPU shown in FIG. 3.

Next, actuation of a self-standing control for moving (returning) the operating lever 10 to a target position, which is the initial position, when starting the vehicle, in a device for operating a vehicle provided with the electric control module 40 constructed as described above will now be described with reference to the flowchart in FIG. 4. FIG. 4 shows a program executed by the CPU 41*a* shown in FIG. 3. This program is recorded in the ROM of the memory 41*d* and is executed repeatedly at short, predetermined intervals of time after the driver turns on the ignition switch 62.

First, the program starts at Step S100. In Step S102, the CPU 41*a* determines whether a self-standing control complete flag F is set to "0". When the self-standing control complete flag F is "1", it indicates that the operating lever 10 is in the target position and that the self-standing control is complete. When the self-standing control complete flag F is set to "0", it indicates that the self-standing control is not complete. The self-standing control complete flag F is initially set to "0" by an initialization process. Therefore in this case, because the self-standing control complete flag F is "0", the determination in Step S102 is YES, and the program proceeds to Step S104 where it is determined whether an error flag FE is set to "0". When the error flag FE is "1", it indicates that there is an object or a part of the driver's body obstructing movement of the operating lever 10 in the direction of the target position. When the error flag FE is "0", it indicates there is no object or part of the driver's body obstructing movement of the operating lever 10 in the direction of the target position. The error flag FE is initially set to "0" by an initialization process.

Here, a monitoring routine for setting the error flag FE will be described. This program is also stored in the ROM of the memory 41*d* and is executed repeatedly at short, predetermined intervals of time by the CPU 41*a*. First, this program starts at Step S200 in FIG. 5. In Step S202, the CPU 41*a* determines whether the self-standing control complete flag F is set to "0".

In this case, because the self-standing control complete flag F is at "0", as described above, the determination in Step S202 is YES so the program proceeds to Step S204 where a position x of the operation lever 10 is input from the operating position sensor 26. Then in Step S206, the input position x is set as a current position $x_n$ indicative of a displacement position of the operating lever 10 during the current execution of the program.

Then in Step S208, an absolute value $|x_n - x_{n-1}|$ of the difference of the set current position $x_n$ minus the last position $x_{n-1}$ is calculated as a moving distance $\Delta x$. This last position $x_{n-1}$ indicates the position x of the operating lever 10 during the last execution of the program, and is set and stored by the process in Step S214 during the last execution of the program.

After the process in Step S208, the program proceeds to Step S210 where it is determined whether the moving distance $\Delta x$ of the operating lever 10 is greater than a minimum moving distance $X_0$. The minimum moving distance $X_0$ is set to be a value that is slightly less than the distance the operating lever 10 moves when the program is executed one time while the operating lever 10 is moving normally. If the moving distance $\Delta x$ of the operating lever 10 is equal to, or less than, the minimum moving distance $X_0$ in this determination, then it is determined that there is something obstructing movement of the operating lever 10.

Now, if the operating lever 10 is moving normally without any problem and the moving distance $\Delta x$ is greater then the minimum moving distance $X_0$, the determination in Step S210 is YES and the program proceeds to Step S212. In Step S212, a count value Cm for measuring the duration of an abnormality in the movement of the operating lever 10 is reset to "0". Then after the process in Step S214, the program proceeds to Step S216 where it temporarily ends.

After a predetermined period of time has passed, the program starts to be executed again from Step S200 and the CPU 41*a* performs the determination process in Step S202. Here, if the operating lever 10 has not yet reached the target position, the self-standing control complete flag F is "0", so the determination in Step S202 is YES and the program proceeds to Step S204 where the position x of the operating lever 10 is input. Then, after the processes in Step S206 and Step S208, it is determined in Step S210 whether the moving distance $\Delta x$ of the operating lever 10 is greater than the minimum moving distance $X_0$, i.e., whether the operating lever 10 is moving normally. As described above, if the operating lever 10 is moving normally, the determination in Step S210 is YES and the processes in Steps S212 and S214 are performed. The program then proceeds to Step S216 where it temporarily ends.

If the operating lever 10 is moving normally in this way, the error flag FE remains "0" from the initial setting.

Returning now to the description of Step S104 in the flowchart in FIG. 4, because the error flag FE is "0", the determination in Step S104 is YES and the program proceeds to Step S106 where the position x of the operating lever 10 is input.

The program then proceeds to Step S108 where it is determined whether the position x of the operating lever 10 is not equal to a final target position X*. This final target position X* is an operating position (displacement position) of the operating lever 10 that is set corresponding to a displacement amount of the steering shaft 48. The final target position X* is set based on a value of the position (angle) of the steered wheels 52a and 52b when the vehicle is stopped that is detected by the stroke sensor 49 as a displacement amount of the steering shaft 48. The positional relationship between the displacement position of the operating lever 10 and the steered wheels 52a and 52b is brought into agreement by positioning the operating lever 10 in the final target position X*.

For example, when the displacement amount of the steering shaft 48 is "0" while the steered wheels 52a and 52b are aligned in the forward-backward direction of the vehicle, the operating lever 10 is in the neutral position in the left-right direction of the vehicle and the operating position is set to be "0". Therefore, the final target position X* is the initial position for returning the operating lever 10. When the ignition switch 62 is OFF such that the supply of electric power is from the battery 61 is interrupted, the left-right reaction force generating mechanism 20 and the forward-reverse reaction force generating mechanism 30 do not apply force on the operating lever, i.e., they are in a non-operating state.

Therefore, when the ignition switch 62 is first turned ON, the operating lever 10 is in a state where it is tilted by its own weight in either the right, left, forward, or backward direction of the vehicle. Normally in this case, the position x of the operating lever differs from the final target position X*. Here, if the position x of the operating lever 10 is not equal to the final target position X*, the determination in Step S108 is YES and the program proceeds to Step S110.

In Step S110, it is determined whether the final target position X* is greater than the position x of the operating lever 10. Here the final target position X* is made "0". If the position x of the operating lever 10 is farther to the left in the vehicle than the final target position X*, it is a minus (−) and the position x of the operating lever 10 becomes smaller than the final target position X*. On the other hand, if the position x of the operating lever 10 is farther to the right in the vehicle than the final target position X*, it is a plus (+) and the position x of the operating lever 10 becomes larger than the final target position X*. If the final target position X* is larger than the position x of the operating lever 10, the determination in Step S110 is YES and the program proceeds to Step S112.

In Step S112, a predetermined current value $I_O$ is set as a motor current value I. The predetermined current value $I_O$ is a value of current supplied to the electric motor 25 in order to make the moving speed of the operating lever 10 a preset speed. In this case, the predetermined current value $I_O$ is a current value that is set for driving the electric motor 25 so as to slowly move the operating lever 10 from a left side position in the vehicle toward the final target position X*. The motor current value I is proportional to the moving speed of the operating lever 10, and the moving speed of the operating lever 10 is proportional to the return force (reaction force) of the operating lever 10. Therefore, the predetermined current value $I_O$ is set to a value able to make the return force of the operating lever 10 sufficiently low so that even if an obstacle or a part of the driver's body were hit by the moving operating lever 10, a large load would not be exerted on that obstacle or part of the driver's body. When the motor current value I has finished being set in Step S112, the program proceeds to Step S114.

Also, if in Step S110 the final target position X* is smaller than the position x of the operating lever 10, the determination in that step is NO and the program proceeds to Step S116. In this case, because the position x of the operating lever 10 is larger than the final target position X*, a predetermined current value $-I_O$ is set as the motor current value I in Step S116. The predetermined current value $-I_O$ is a current value for driving the electric motor 25 so as to move the operating lever 10 from a right side position in the vehicle toward the final target position X*. The rotational force driving the electric motor 25 is equal to that when the predetermined current value $I_O$ is set as the motor current value I, and the direction of rotation is the opposite. After the motor current value I is set in Step S116, the program proceeds to Step S114.

In Step S114, the CPU 41a outputs the current value I as a signal to the electric motor 25 via the output interface 41c and the drive circuit 42. As a result, the electric motor 25 is driven in one direction or the other such that the operating lever 10 nears the final target position X*, regardless of whether the program proceeded via Step S112 or Step S116. The program then proceeds to Step S118 where it temporarily ends.

After a predetermined period of time has passed, the program starts to be executed again from Step S100. The determination processes in Steps S102 and S104 are performed and the program proceeds to Step S106 where the position x of the operation lever 10 is input. Then in Step S108, it is determined whether the new position x of the operating lever 10 is not equal to the final target position X*. If they are not equal, the determination is YES and the program proceeds to Step S110. In Step S110 it is determined whether the final target position X* is larger than the position x of the operating lever 10. After the determination is made in Step S110, the process in either Step S112 or Step S116, described above, is performed and the program proceeds to Step S114.

In Step S114, the electric motor 25 is driven based on an output of the current value I. As a result, the operating lever 10 again nears the final target position X* at a speed corresponding to the current value I. The program then proceeds to Step S118 where it temporarily ends.

Also, after a predetermined period of time has passed, the same processes are repeated, with the program starting to be executed from Step S100. When the newly set position x of the operating lever 10 is equal to the final target position X* in Step S108, the determination is NO and the program proceeds to Step S120. In Step S120, the self-standing control complete flag F is set to "1". The program then proceeds to Step S118 where it ends.

Also, when the program is executed again, because the self-standing control complete flag F is set to "1", the determination in Step S102 is NO and the program proceeds to Step S118 where it ends. Thereafter, if the program is repeated, because the self-standing control of the operating lever 10 is complete, the determination in Step S102 is NO so the program proceeds to Step S118 and ends.

Returning now to the monitoring routine in FIG. 5, a case in which the error flag FE is "1" such that the determination in Step S104 is NO before the self-standing control complete flag F is set to "1" in Step S120 and the self-standing control ends, will be described.

As described above, when the operating lever 10 is moving normally, the error flag FE is set at "0" from the initial setting. In the monitoring routine in FIG. 5, the processes in Steps S200 through S216 are repeated. Then, if the moving distance Δx of the operating lever 10 is less than the minimum moving distance $X_0$, such that the determination in Step S210 is NO, it is determined that there is a possibility of an abnormality in the movement of the operating lever 10. Then the program proceeds to Step S218 where the count value Cm is set to a value in which "1" has been added. Here, "1" is added to the count value Cm in order to count the time that has passed after it was determined that there is a possibility of an abnormality in the movement of the operating lever 10 as the number of times the program has been executed.

Next in Step S220, it is determined whether the count value Cm is greater than a predetermined value CM. The predetermined value CM indicates an upper limit value of the count value. When the count value Cm is greater than the predetermined value CM, it is determined that there is an obstacle obstructing the movement of the operating lever 10, i.e., an abnormal state. That is, the predetermined value CM is set based on whether the movement of the operating lever 10 is still normal, or on the maximum amount of time for which a possibility of the movement of the operating lever 10 returning to normal remains, after the moving distance Δx has become smaller than the minimum moving distance $X_0$.

If the count value Cm is smaller than the predetermined value CM, the determination in Step S220 is NO, and the program proceeds to Step S216 where it ends. Also, by executing the program thereafter, "1" is added to the count value Cm in Step S218. This process is repeated until the count value Cm is greater than the predetermined value CM. During that time, if the operating lever 10 starts to move normally and the moving distance Δx of the operating lever 10 becomes greater than the minimum moving distance $X_0$, the determination in Step S210 is YES. After the processes in Steps S212 through S216 are performed, the processes in Steps S200 through S216 are then repeated.

Meanwhile, the count value Cm is summed up and when it becomes greater than the predetermined value CM, the determination in Step S220 is YES and the program proceeds to Step S222 where the error flag FE is set to "1". By the error flag FE being set to "1", it is determined that there is an object or a part of the driver's body in the direction of movement of the operating lever 10 that is obstructing the movement of the operating lever 10, and the program proceeds to Step S224 where a warning is issued.

This warning is issued by sounding the warning buzzer 50 installed in the vehicle. By this warning, the driver can be notified that there is an obstruction in the vicinity of the operating lever 10. Also, in this monitoring routine, if the self-standing control has finished by executing the self-standing control program shown in FIG. 4 while the program is executed without any problems and the program is executed again, the determination in Step S202 is NO because the self-standing control complete flag F is set to "1" and the program proceeds to Step S216 where it ends.

Also, when an abnormality is detected during execution of the program of the monitoring routine and the error flag FE is set to "1", the determination in Step S104 of the self-standing control program shown in FIG. 4 is NO and the program proceeds to Step S118 where it ends. As a result, the operating lever 10 stops and the self-standing control stops such that the operating lever 10 is not forced to the final target position X*.

(First Modified Example of the First Embodiment)

Next, a first modified example of the self-standing control shown in FIG. 4 will be described with reference to FIG. 6. The CPU 41a may execute the routine shown in the flowchart in FIG. 6 instead of the routine shown in the flowchart in FIG. 4. Steps in FIG. 6 that are the same as those in FIG. 4 shall be denoted by the same reference numerals and detailed descriptions thereof shall be omitted.

Figure 6:
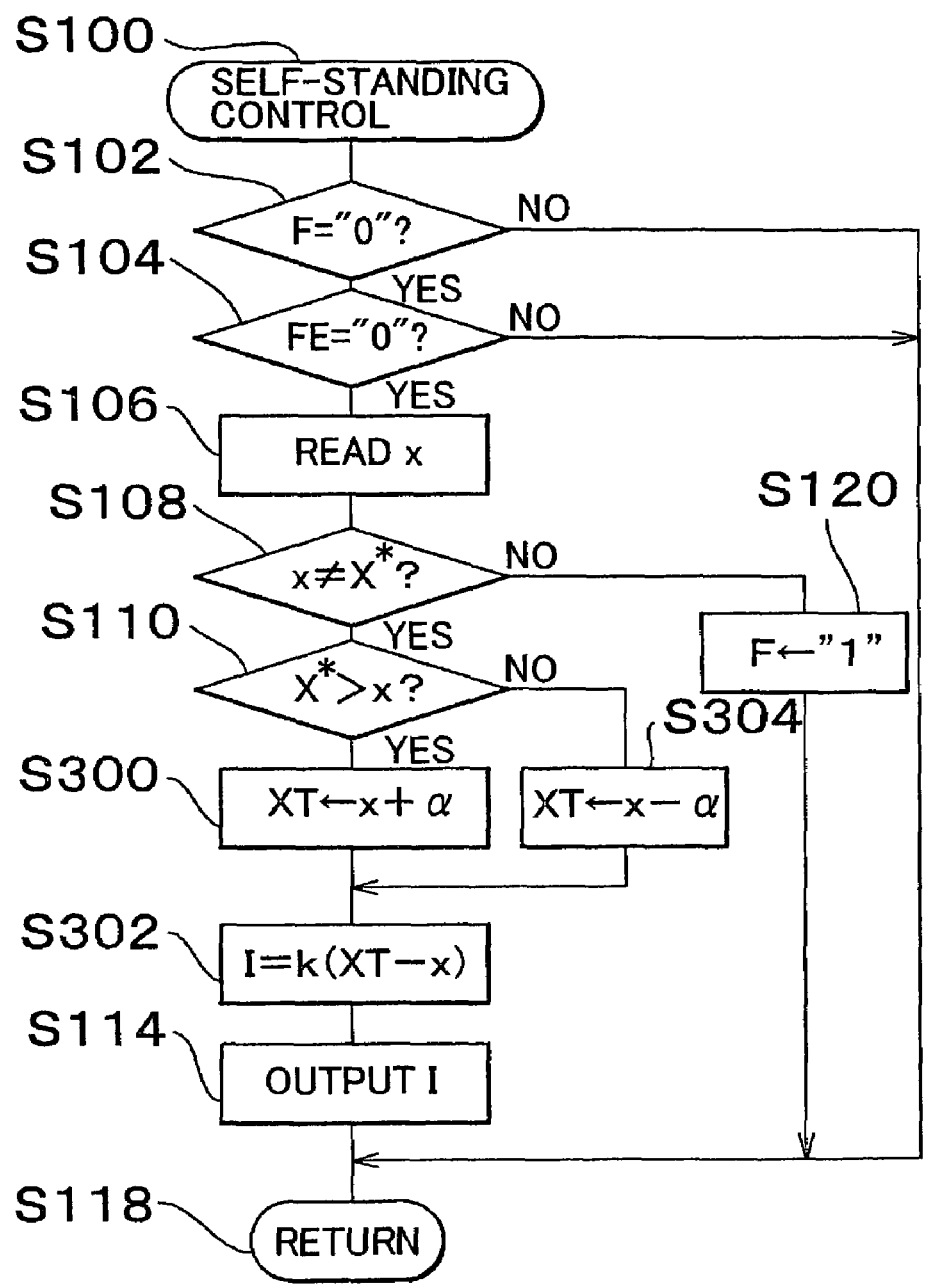
FIG. 6 is a flowchart showing a modified example of the self-standing control executed by the CPU shown in FIG. 3.

In the flowchart in FIG. 6, Steps S300 through S304 replace Steps S112 and S116 in the flowchart in FIG. 4. If the final target position X* is larger than the position x of the operating lever 10, the determination in Step S110 is YES and the program proceeds to Step S300. In Step S300, the sum of the position x of the operating lever 10 plus a predetermined value a is set as a moving target position XT. If the routine is such that the program is executed every 10 msec, for example, the predetermined value α is indicative of a value that is set as the distance the operating lever 10 should advance in 10 msec, which is one calculation cycle, and the moving target position XT indicates a position to which the operating lever 10 would be moved according to that value.

By the process in Step S300, the moving target position XT becomes a value that approaches the final target position X* from the position x of the operating lever 10 by the amount of the predetermined value α. Therefore, the moving target position XT becomes a target position that is updated each time the operating lever 10 advances by the amount of the predetermined value α. When the moving target position XT is finished being set in Step S300, the program proceeds to Step S302.

Also, if the final target position X* is smaller than the position x of the operating lever 10, the determination in Step S110 is NO and the program proceeds to Step S304. In this case, because the position x of the operating lever 10 is larger than the final target position X*, a value in which the predetermined value a has been subtracted from the position x of the operating lever 10 is set as the moving target position XT in Step S304. As a result, the moving target position XT becomes a value that approaches the final target position X* from the position x of the operating lever 10 by the amount of the predetermined value α. After the moving target position XT is set in Step S304, the program proceeds to Step S302.

In Step S302, the current value I to be conducted to the electric motor 25 is calculated by the CPU 41a by a calculation process. The current value I in this case is set to a value obtained by multiplying the difference of the moving target position XT minus the position x of the operating lever 10 by a predetermined constant k. When the value of the moving target position XT is obtained by the process in Step S300, the current value I becomes a positive value, and when the value of the moving target position XT is obtained by the process in Step S304, the current value I becomes a negative value. Then the program proceeds to Step S114 where the CPU 41a outputs the calculated value of the current value I as a signal to the electric motor 25 via the output interface 41c and the drive circuit 42. As a result, the electric motor 25 is driven in one direction or the other. In either case, the operating lever 10 nears the final target position X* by the amount of the predetermined value α. The program then proceeds to Step S118 where it ends.

The return force (moving speed) when the operating lever 10 approaches the final target position X* is substantially proportional to the size of the current value I. Therefore, when the predetermined constant k is set large, the return force of the operating lever 10 becomes large, and when the predetermined constant k is set small, the return force of the operating lever 10 becomes small. Accordingly, by appropriately setting the predetermined constant k, it is possible to set the return force of the operating lever 10 to a size corresponding to the size of the predetermined constant k. In this case, it is preferable to set the predetermined constant k to a small value and reduce the return force. As a result, it is possible to control the return force so that it is less than the normal reaction force by a reaction force control (FIG. 8), to be described later.

(Second Modified Example of the First Embodiment)

Figure 7:
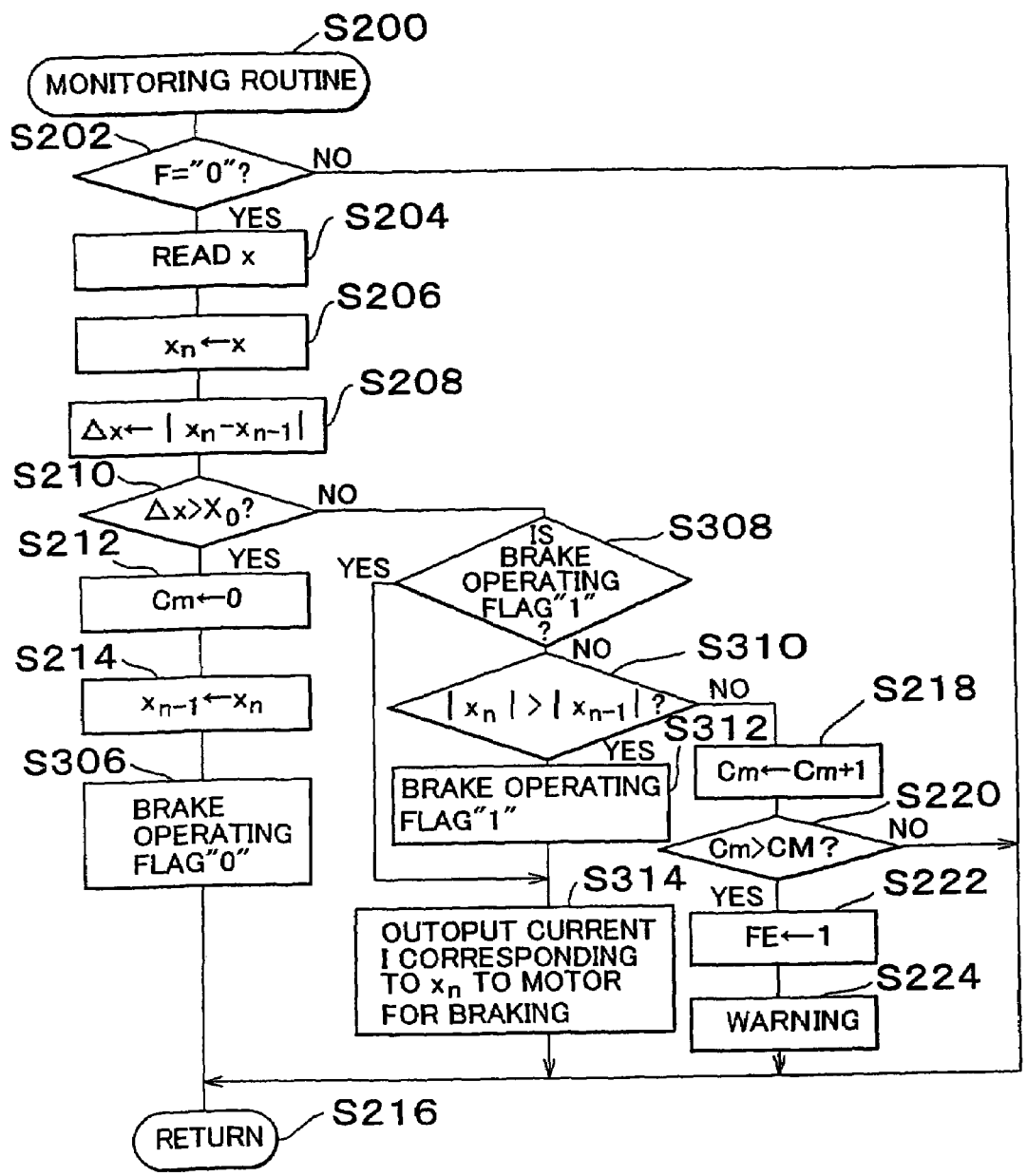
FIG. 7 is a flowchart showing a modified example of the monitoring routine executed by the CPU shown in FIG. 3.

Next, a first modified example of the monitoring routine shown in FIG. 5 will be described with reference to FIG. 7. The monitoring routine shown in FIG. 7 is for performing stop control when an abnormality has occurred when the operating lever 10 is moving to the target position. The monitoring routine shown in FIG. 7 may be executed instead of the routine shown in FIG. 5. Steps in FIG. 7 that are the same as those in FIG. 5 shall be denoted by the same reference numerals and detailed descriptions thereof shall be omitted. The processes in Steps S200 through S214, S306 and S216 in this program are the same as the processes in Steps S200 through 216 in the program shown in FIG. 5. By the processes in these steps it is determined that the operating lever 10 is moving normally toward the final target position X*.

In this program, after the current position $x_n$ is set as the last position $x_{n-1}$ in Step S214, a process is performed in Step S306 to set the brake operating flag to "0". When this brake operating flag is "1", it indicates that the operating lever 10 is not being automatically operated normally. When this brake operating flag is "0", it indicates that the operating lever 10 is being automatically operated normally.

If the moving distance Δx of the operating lever 10 is smaller than the minimum moving distance $X_0$, the determination in Step S210 is NO and the program proceeds to Step S308. In Step S308, it is determined whether the brake operating flag is "1". Because the brake operating flag is set to "0" in Step S306, the determination is NO and the program proceeds to Step S310. In Step S310, it is determined whether an absolute value of the current position $x_n$ of the operating lever 10 is greater than an absolute value of the last position $x_{n-1}$. The determination process in Step S310 is a process to detect whether the driver has operated the operating lever 10 to the minus side. Here, if the driver has not operated the operating lever 10, the operating lever 10 approaches the final target position X* and the absolute value of the current position $x_n$ becomes smaller than the absolute value of the last position $x_{n-1}$ such that the determination in Step S310 is NO, and the program proceeds to Step S218.

Figure 5:
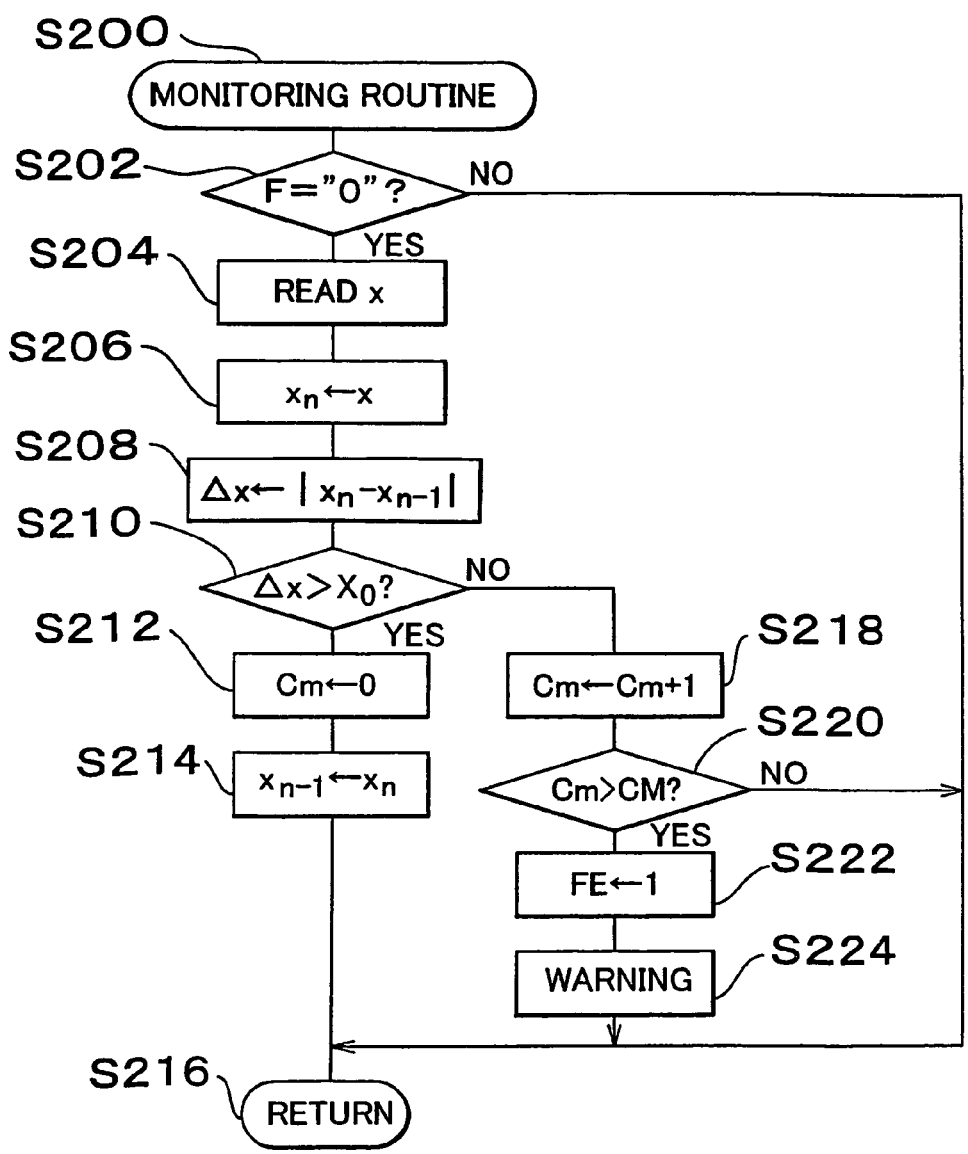
FIG. 5 is a flowchart showing a monitoring routine executed by the CPU shown in FIG. 3.

The processes in Steps S218 through S224 are the same as the processes in Steps S218 through S224 in the flowchart in FIG. 5. Every time the program is executed, the count value Cm is updated to a value in which "1" has been added. When the count value Cm becomes greater than the predetermined value CM, the error flag FE is set to "1" in Step S222 and a warning is issued by the warning buzzer 50 in Step S224.

Also, if the absolute value of the current position $x_n$ of the operating lever 10 is greater than the absolute value of the last position $x_{n-1}$, the determination in Step S310 is YES and the program proceeds to Step S312. In this case, it is determined that the driver has purposely operated the operating lever 10, not that an object or a part of the driver's body has unintentionally contacted the operating lever 10, and that the operating lever 10 is not being automatically operated normally. As a result, the brake operating flag is set to "1". The program then proceeds to Step S314 where brake control is performed. In Step S314, the current value I to be conducted to the electric motor 46 for braking is obtained, for example, from a map stored in the memory 41d, and then output to the electric motor 46 for braking via the output interface 41c and the brake circuit 47.

Here, the current value I is a value corresponding to the current position $x_n$ from a map stored in the memory 41d. This current value I drives the electric motor 46 for braking to stop the vehicle. That is, a braking force is generated which increases the larger the operation amount of the operating lever 10 by the driver. The program then proceeds to Step S216 where it ends. When the program is executed again and the determination in Step S210 is NO, the program proceeds to Step S308. Because the brake operating flag is set to "1", the determination in Step S308 is YES and the program proceeds to Step S314 where the current I is output to the electric motor 46 for braking.

In this way, with this device for operating a vehicle, the operating lever 10 is set so as to automatically return to the initial position. If an object or a part of the driver's body contacts the operating lever 10 while it is automatically returning to the initial position, a warning is issued from the warning buzzer 50. When it can be determined that the driver intentionally operated the operating lever 10, the brake control is performed. As a result, it is possible for the driver to be aware of an abnormality that occurs when the operating lever 10 is being returned. It is also possible to prevent the vehicle from unintentionally taking off, thus ensuring safety.

In the foregoing description, a control method is disclosed for moving the operating lever 10 in the left-right direction of the vehicle so that it approaches the final target position X* in the left-right direction of the vehicle. However, in the case of moving the operating lever 10 in the forward-backward direction of the vehicle so that it approaches a final target position Y* in the forward-backward direction of the vehicle, in the flowcharts in FIGS. 4 through 7, the position x of the operating lever 10 may be replaced by a position y of the operating lever 10, the final target position X* may be replaced by the final target position Y*, and the moving target position XT may be replaced by a moving target position YT. The operating lever 10 can then be moved in the forward-backward direction toward the final target position Y* by performing substantially the same processes.

Figure 8:
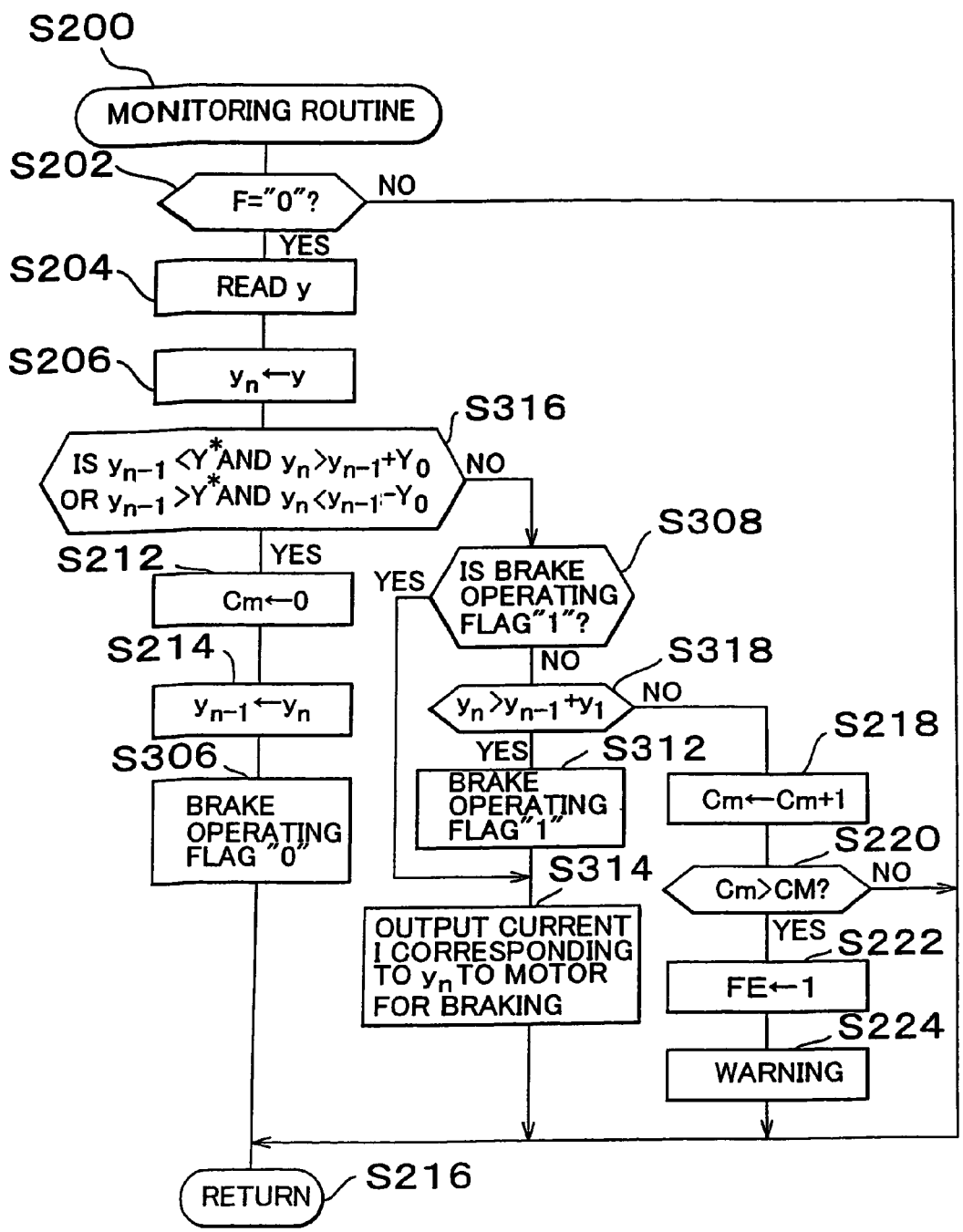
FIG. 8 is a flowchart showing a modified example of the monitoring routine shown in FIG. 7.

As an example of this, a modified example of the monitoring routine shown in FIG. 7, in which the operating lever 10 is moved in the forward-backward direction of the vehicle, is shown in FIG. 8. The monitoring routine shown in FIG. 8 is for performing stop control. Steps in FIG. 8 that are the same as those in FIG. 7 (i.e., Steps S200, S202, S212, S306, S216, S308, S312, and S218 through S224) and the steps in which simply the position x was replaced with the position y (i.e., Steps S204, S206, S214, S314) shall be denoted by the same reference numerals and detailed descriptions thereof shall be omitted. The processes in Steps S200 through S206, S316, S212, S214, S306, and S216 in this program are substantially the same as the processes in Steps S200 through S214, S306, and S216 in the program in FIG. 7. It is determined that the operating lever 10 is moving normally toward the final target position Y* by the processes in these steps.

The process in Step S316 is performed considering not only the absolute value of the moving distance that the operating lever 10 moves, but also the direction of that movement. In this step, it is determined whether both a last position $y_{n-1}$ is less than the final target position Y* and a current position $y_n$ is greater than a value which is the sum of the last position $y_{n-1}$ and a minimum moving distance $Y_0$, or whether both the last position $y_{n-1}$ is greater than the final target position Y* and the current position $y_n$ is less than a value which is the difference of the last position $y_{n-1}$ minus the minimum moving distance $Y_0$. If either of these is true, the operating lever 10 is then moved toward the final target position Y*. In this case, the determination in Step S316 is YES. After the process in Steps S212, S214, and S306 are performed, the program proceeds to Step S216 where it ends.

Also, if the determination in Step S316 is NO, the program proceeds to Step S308, where it is determined whether the brake operating flag is "1". Because the brake operating flag is set to "0", the determination is NO and the program proceeds to Step S318. In Step S318, it is determined whether the current position $y_n$ of the operating lever 10 is greater than the value which is the sum of the last position $y_{n-1}$ and a minimum operating distance $y_1$. This minimum operating distance $y_1$ is a determination stroke (a constant) that is set for determining brake operation. When the moving distance of the operating lever 10 exceeds this minimum operating distance $y_1$, it is determined that there is a brake operation.

Here, if the driver operates the operating lever 10 and the moving distance of the operating lever 10 exceeds the minimum operating distance $y_1$, the determination in Step S318 is YES and the program proceeds to Step S312. In this case, because the operating lever 10 is not being automatically operated normally, the brake flag is set to "1" in Step S312. Then in Step S314, the current I corresponding to the current position $y_n$ is output to the electric motor 46 for braking. Thereafter, the determination in Step S316 is NO so the program proceeds to Step S308. Because the brake operating flag is set to "1", the determination in Step S308 is YES so the program proceeds to Step S314 where the current I is output to the electric motor 46 for braking.

Also, if the moving distance of the operating lever 10 does not exceed the minimum operating distance $y_1$ such that the determination in Step S318 is NO, the program proceeds to Step S218 and Steps S218 through S224 are performed. These are the same as the processes in Steps S218 through S224 in the flowchart shown in FIG. 7. Every time the program is executed, the count value Cm is updated to a value in which "1" has been added. When the count value Cm becomes greater than the predetermined value CM, the error flag FE is set to "1" in Step S222 and a warning is issued by the warning buzzer 50 in Step S224.

Also, when automatic operation of the operating lever 10 becomes normal such that the determination in Step S316 is YES, the processes in Steps S212 and S214 are performed, after which the brake operating flag is set to "0" in Step S306. The program then proceeds to Step S216 where it ends. Then, when the program is executed again, it performs the processes of when the automatic operation is performed normally, which are Steps S200 through S206, S316, S212, S214, S306, and S216. In this case, the position of the operating lever 10 is detected by the operating position sensor 36 and the current value I to be conducted to the electric motor 35 is calculated by the CPU 41a by a calculation process. The calculated value is then output as a signal to the electric motor 35 via the output interface 41c and the drive circuit 43. As a result, the operating lever 10 is moved in the forward-backward direction until it reaches the final target position Y* and the self-standing control of the operating lever 10 ends.

Next, the reaction force control after the operating lever 10 has reached the final target position X*, which is the initial position, will be described with reference to FIG. 9. This program is repeatedly executed at short, predetermined intervals of time by the CPU 41a while the vehicle is being operated after the operating lever 10 has reached the final target position X*. First, the program starts at Step S400, and in Step S402, the CPU 41a determines whether the self-standing control complete flag F is set to "1".

Because the self-standing control complete flag F is set to "1" after the operating lever 10 has reached the final target position X* in the self-standing control routine shown in FIG. 4 or FIG. 6, the determination in Step S402 is YES and the program proceeds to Step S404 where the position x of the operating lever 10 is input. The program then proceeds to Step S406 where a target reaction force Fx is determined from the position x of the operating lever 10 and a map of the target reaction force shown in Step S406.

Then the program proceeds to Step S408 where a motor current such that the output of the electric motor 25 matches the target reaction force Fx is determined. The program then proceeds to Step S410 where it ends. Also, the reaction force for the position y of the operating lever 10 in one more axial direction of the vehicle may be obtained in a similar manner.

Figure 10:
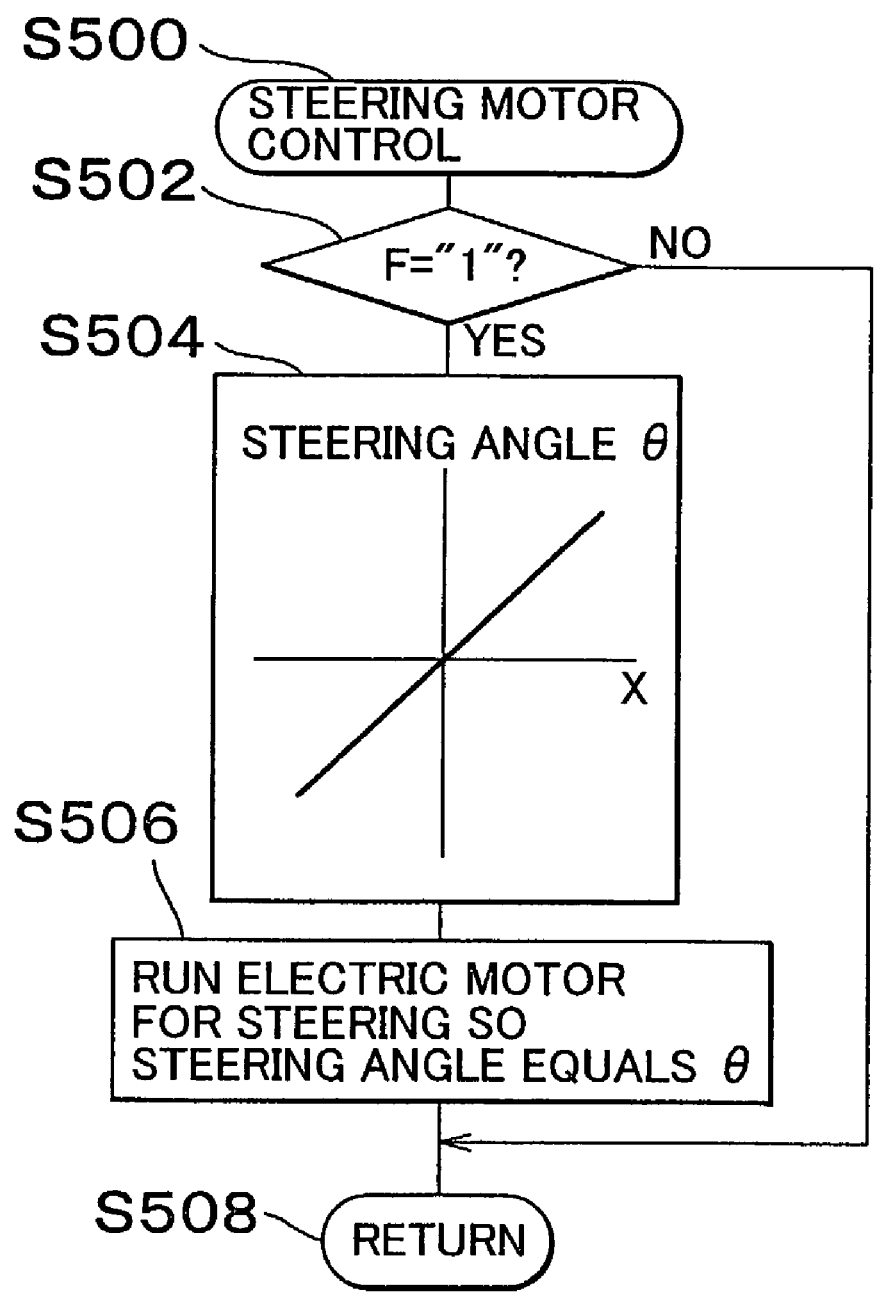
FIG. 10 is a flowchart showing a steering motor control executed by the CPU shown in FIG. 3.

Next, a control for the steering motor, shown in FIG. 10, will be described. This program is repeatedly executed at short, predetermined intervals of time by the CPU 41a while the vehicle is being operated after the operating lever 10 has reached the final target position X*. First, the program starts at Step S500, and in Step S502, the CPU 41a determines whether the self-standing control complete flag F is set to "1".

Because the self-standing control complete flag F is set to "1" after the operating lever 10 has reached the final target position X* in the self-standing control routine shown in FIG. 4 or FIG. 6, the determination in Step S502 is YES and the program proceeds to Step S504 where a target steering angle θ is determined from the position x of the operating lever 10 and a map of the steering angle shown in Step S504. Because the target steering angle θ is proportional to the displacement amount of the steering shaft 48, the target steering angle θ is proportional to the position x, as shown in the figure.

Next, the program proceeds to Step S506 where a motor current is conducted to the electric motor 44 for steering so as to achieve the target steering angle θ. Accordingly, the steering shaft 48 is displaced in accordance with the operating position (position x) of the operating lever 10 so as to produce a steering angle θ in the steered wheels 52a and 52b. The program then proceeds to Step S508 where it ends. Also, when the program is executed again and the position x has changed by an operation of the operating lever 10, a steering angle θ in accordance with that position x at that time is produced in the steered wheels 52a and 52b. Further, if the self-standing control complete flag F is set to "0", the determination in Step S502 is NO and the program proceeds to Step S508 where it ends.

It is clear from the foregoing description that the invention provides a control of the reaction force of the operating member independently from the control of the return force.

Moreover, according to the above described embodiment, the reaction force is generated after the operating member has substantially reached an initial position under the return force control. That initial position can be used various positions. In the above embodiment, the initial position is the self-standing or neutral position of the operating member. However, as can be clear from the description of other embodiments, the initial position can be selected in like with other criteria.

With other words, the above embodiment is designed and operated in such a manner that it is determined whether the operating member is being moved to substantially an initial position after the electric power has to be supplied, and that the mode of the reaction force control is changed in accordance with the result of the determination step.

(Second Embodiment)

Next, a control during return of the operating lever 10 according to another exemplary embodiment of the invention will be described with reference to the flowchart in FIG. 11. The program in this flowchart is executed in a device for driving a vehicle that is substantially similar in construction to that of the device for operating a vehicle described above. This program is an example of a program that performs the reaction force control after the operating lever 10 has been returned to the initial position manually by the driver.

In this program, the ignition switch 62 is turned off such that power is no longer supplied from the battery 61, and the operating lever 10, to which a force is not being applied from the left-right reaction force generating mechanism 20 and the forward-backward reaction force generating mechanism 30 (i.e., the operating lever 10 is in an unloaded state), is operated to the initial position manually by the driver.

Figure 12:
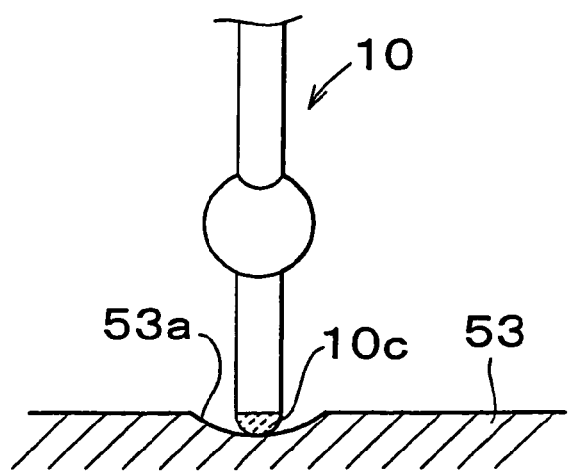
FIG. 12 is a front view showing a lower end portion of the operating lever and a vehicle body side portion against which that lower end portion abuts.
Figure 13:
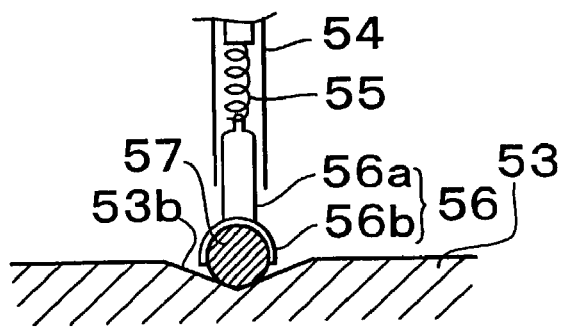
FIG. 13 is a front view showing a lower end portion according to a modified example of the operating lever and a vehicle body side portion against which that lower end portion abuts.

In this case, it is preferable to construct a lower end side portion of the operating lever 10 like that shown in FIG. 12 or FIG. 13. In FIG. 12, a lower end face 10c of the operating lever 10 is formed in a hemispherical shape. A hemispherical concave portion 53a is formed at a portion corresponding to the initial position of the operating lever 10 in a vehicle body side portion 53 against which this lower end face 10c abuts. The lower end face 10c of the operating lever 10 and the concave portion 53a of the vehicle body side portion 53 enable the operating lever 10 to be easily positioned when moving the operating lever 10 to the initial position.

Also, in FIG. 13, the lower side portion of the operating lever 10 includes a cylindrical portion 54, of which the lower face is open, a ball support portion 56 that is attached to a coil spring 55 and which is provided in the cylindrical portion 54, and a ball 57. The ball support portion 56 includes a rod body 56a and a dome shaped cover portion 56b. The upper end of the rod body 56a is connected to the coil spring 55 and the upper portion side of the rod body 56a is positioned within the cylindrical portion 54. The covering portion 56b is connected to the lower end of the rod body 56a and covers the upper portion side of the ball 57 while enabling the ball 57 to rotate freely. Accordingly, the ball 57 is urged toward the lower side of the cylindrical portion 54 by the elasticity of the coil spring 55.

Also, a cone shaped concave portion 53b is formed at a portion corresponding to the initial position of the operating lever 10 in the vehicle body side portion 53 against which the ball 57 abuts. This facilitates correct positioning of the ball 57 in the center portion of the concave portion 53b, i.e., this facilitates positioning of the operating lever 10 in the initial position.

According to this construction, after the ignition switch 62 is turned on, the program starts at Step S600 and proceeds to Step S602 where it is determined whether the self-standing control complete flag F is set to "0". Because the self-standing control complete flag F is initially set to "0" in the initialization process, the determination in Step S602 is YES and the program proceeds to Step S604. In Step S604, it is determined whether a steering angle st matches a target steering angle ST that corresponds to a final target position $X_1$. Because this steering angle st becomes equal to the target steering angle ST by executing the program in FIG. 14, to be described later, the determination in Step S604 is YES and the program proceeds to Step S606 where the position x of the operating lever 10 is input.

Then in Step S608 it is determined whether the position x of the operating lever 10 is equal to the final target position $X_1$. This final target position $X_1$ is set to a position in which the operating lever 10 is positioned in the neutral position in the left, right, forward and backward directions of the vehicle and the displacement position is "0". Also, this final target position $X_1$ corresponds to the displacement amount of the steering shaft 48, and the steering shaft 48 moves to a position corresponding to the final target position $X_1$ of the operating lever 10 by executing the program shown in FIG. 14 in advance.

Figure 14:
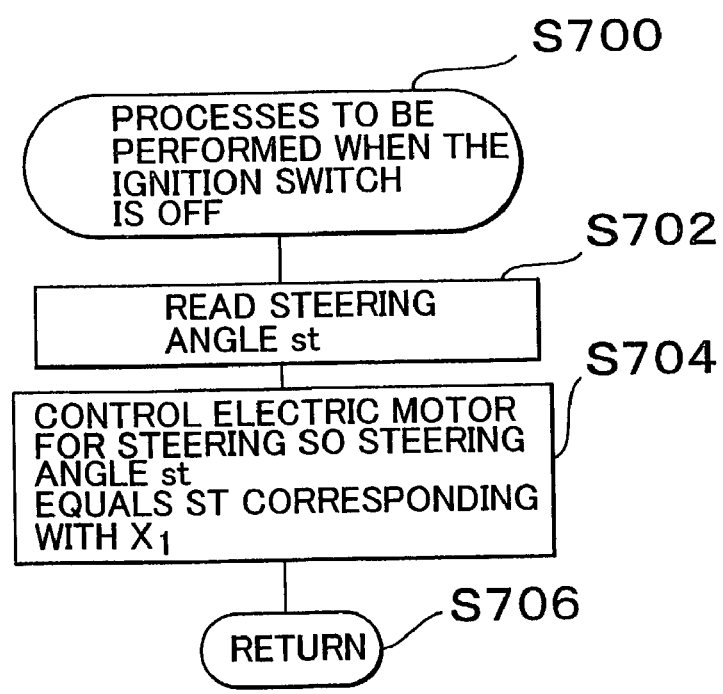
FIG. 14 is a flowchart showing processes to be performed when the ignition switch is OFF executed by the CPU shown in FIG. 3.

That is, the flowchart shown in FIG. 14 illustrates a program of processes to be performed when the ignition switch is OFF, which are performed when the ignition switch 62 has been turned from ON to OFF and the vehicle is stopped. The program starts from Step S700 and proceeds to Step S702 where the CPU 41a inputs the steering angle st corresponding to the displacement amount of the steering shaft 48 detected by the stroke sensor 49.

Next in Step S704, the electric motor 44 for steering is controlled such that the steering angle st matches the target steering angle ST that corresponds with the final target position $X_1$. As a result, the displacement amount of the steering shaft 48 becomes "0" and the steering shaft 48 corresponds with the final target position $X_1$. That is, when the vehicle is stopped, the displacement of the steering shaft 48 becomes "0" and the steered wheels 52a and 52b become aligned in the forward-backward direction of the vehicle. The program then proceeds to Step S706 where it ends.

Figure 11:
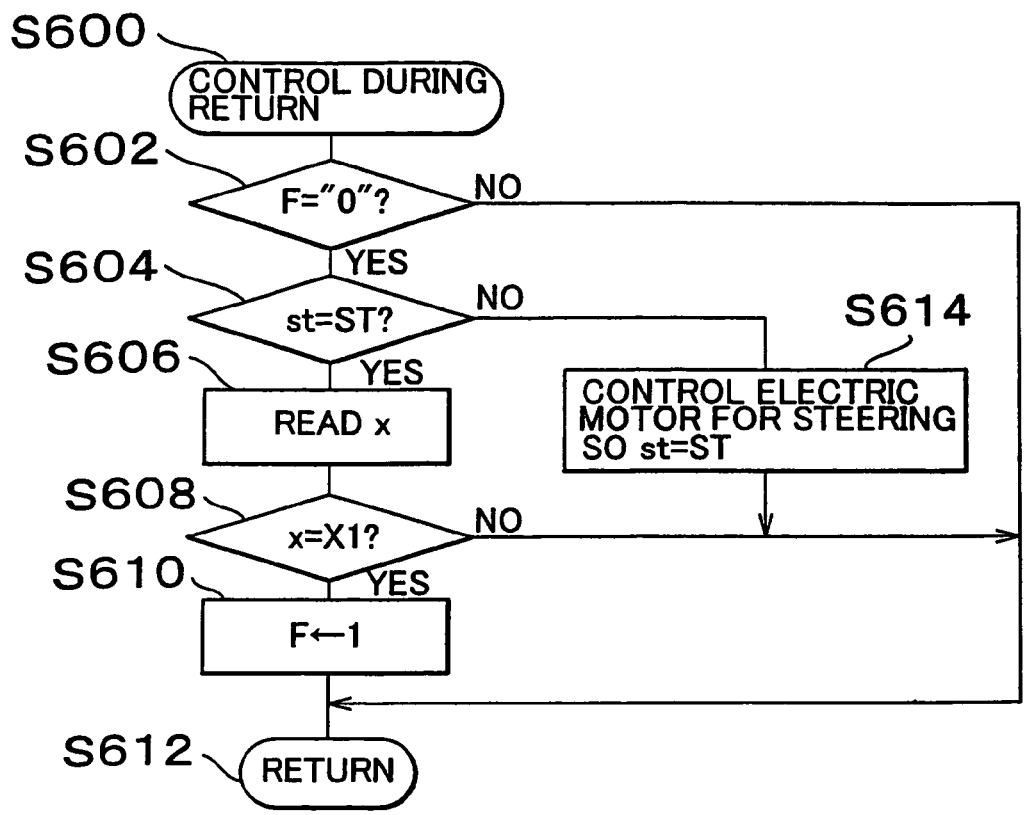
FIG. 11 is a flowchart showing a control during return executed by the CPU shown in FIG. 3.

Returning now to the flowchart in FIG. 11, if the driver moves the operating lever 10 to the initial position such that the position x of the operating lever 10 is equal to the final target position $X_1$, the determination in Step S608 is YES and the program proceeds to Step S610 where the self-standing control complete flag F is set to "1". The program then proceeds to Step S612 where it ends. Also, if the position x of the operating lever 10 does not equal the final target position $X_1$, the determination in Step S608 is NO and the program proceeds to Step S612 where it ends.

Also, if the steering shaft 48 is displaced after the ignition switch 62 is turned off, such that the determination in Step S604 is NO, the program proceeds to Step S614. In Step S614, the electric motor 44 for steering is controlled such that the steering angle st matches the final steering angle ST. The program then proceeds to Step S612 where it ends. The process in Step S614 is repeated until the steering angle st matches the target steering angle ST and the determination in Step S604 is YES.

Consequently, this embodiment provides the following concept: in a system which generates a reaction force against the operating member when electric power is supplied, means are provided to bring a corresponding relation ship between a position of the operating member and a steering angle of a wheel into agreement when the supply of electric power is interrupted.

Also, when the program ends after the self-standing control complete flag F is set to "1" in Step S610, the vehicle can be operated by the operating lever 10. At that time, a reaction force based on the reaction force control shown in FIG. 9 is generated in the operating lever 10. Moreover, the vehicle can be steered based on the steering motor control shown in FIG. 10. When the program ends after the determination is NO in Step S608, the operation in which the operating lever 10 is manually moved such that the position x matches the final target position $X_1$ is performed again, and the self-standing control ends. In this way, this exemplary embodiment enables the self-standing control for returning the operating lever 10 to be performed extremely easily.

Because Step S604 and Step S614 are provided in the program shown in FIG. 11, it is possible to omit execution of the program of the processes to be performed when the ignition switch is OFF shown in FIG. 14. Also, the second exemplary embodiment is not limited to the case in which the operating lever 10 is returned to the initial position manually by the driver. For example, it is also possible to connect a motor that generates a small force compared to the electric motors 25 and 35 to the operating lever 10 via a clutch, and drive the motor, engage the clutch, and return the operating lever 10 to the initial position only in the case of returning the operating lever 10 to the initial position.

(Third Embodiment)

Figure 15:
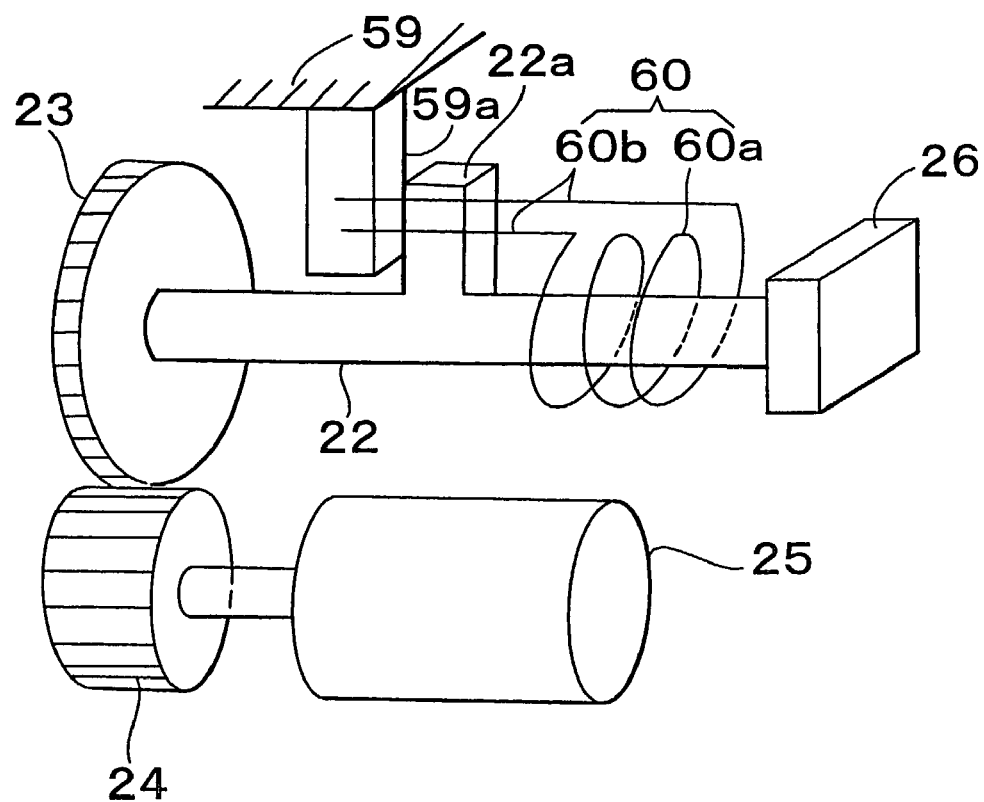
FIG. 15 is a partially enlarged perspective view showing retaining means formed of a retaining protrusion and a torsion spring.

Also, as still another exemplary embodiment of the invention, retaining means can be provided for automatically controlling the operating lever 10 to the initial position when the ignition switch 62 is OFF and no electric power is being supplied, as shown in FIG. 15. This retaining means is provided in a device for driving a vehicle that is substantially similar in construction to that of the device for operating a vehicle described above. This retaining means is provided for both the left-right reaction force generating mechanism 20 and the forward-backward reaction force generating mechanism 30. In order to simplify the description, only the retaining means that is provided for the left-right reaction force generating means 20 will be described. This retaining means is constructed with a retaining protrusion 22a that protrudes upward from the rotation shaft 22 of the left and right reaction force generating mechanism 20, a retaining protrusion 59a that is mounted perpendicularly from the vehicle side portion 59 toward the rotation shaft 22, and a torsion spring 60.

The torsion spring 60 is formed with a coil shaped portion 60a that fits loosely around the circumference of the rotation shaft 22, and sandwiching portions 60b that extend parallel, with a gap therebetween, from both end portions of the coil shaped portion 60a toward both of the retaining protrusions 22a and 59a. By sandwiching the retaining protrusions 22a and 59a with the sandwiching portions 60b, the rotation shaft 22 is retained in a certain position (in the direction in which the operating lever 10 is moved to the initial position). The elasticity of the torsion spring 60 is set to a minimum value that is just enough to retain the operating lever 10 in the initial position when the ignition switch 62 is OFF so the rotation shaft 22 can still be rotated by operating the electric motor 25.

This retaining means is also provided for the forward-backward reaction force generating mechanism 30, as described above. By these two retaining means, the operating lever 10 is able to be automatically controlled to the initial position when the ignition switch 62 is OFF. Also, the control when returning the operating lever 10 in this case is performed in substantially the same way as the program in the flowchart in FIG. 11. In this case as well, the processes to be performed when the ignition switch is OFF, shown in FIG. 14, are performed when the ignition switch 62 is switched from ON to OFF.

Figure 9:
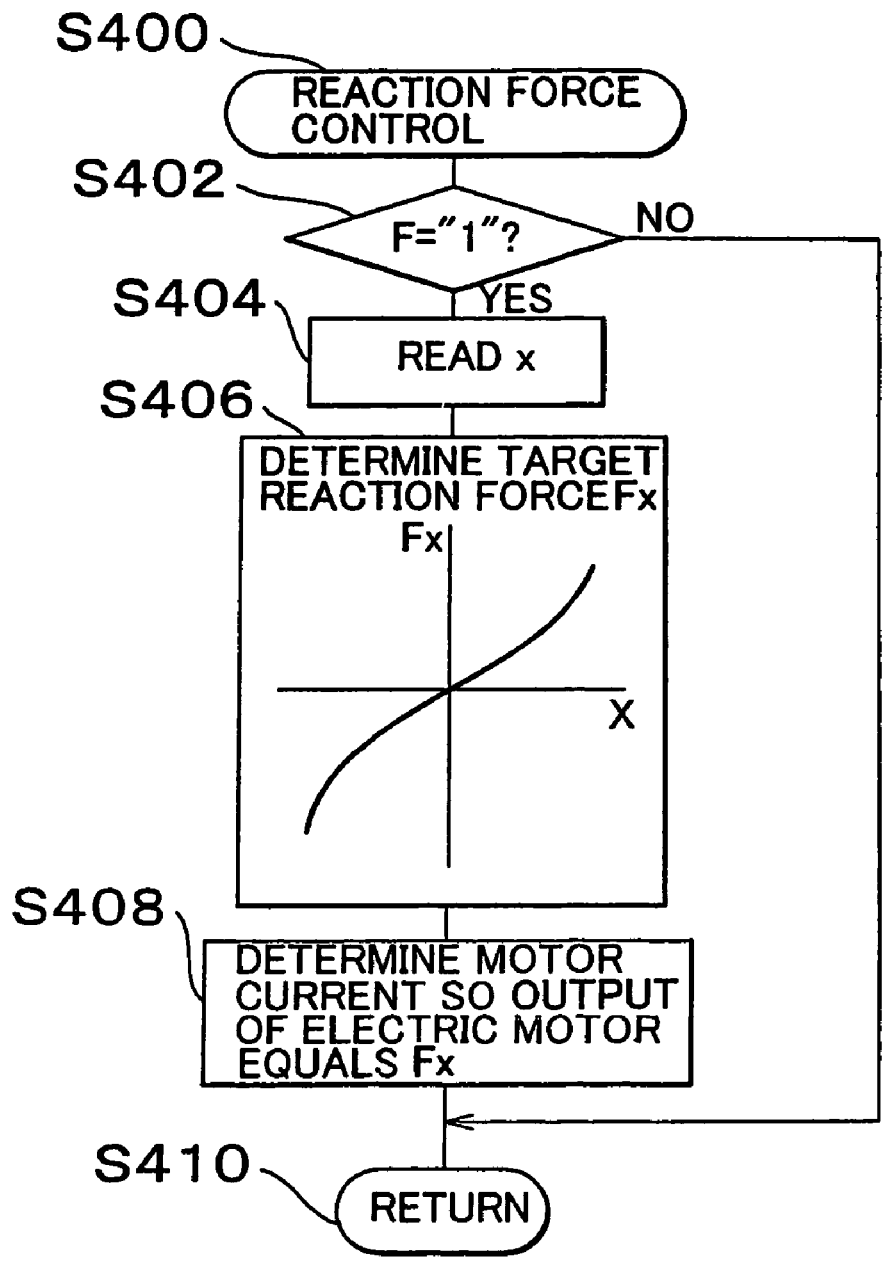
FIG. 9 is a flowchart showing a reaction force control executed by the CPU shown in FIG. 3.
Figure 16:
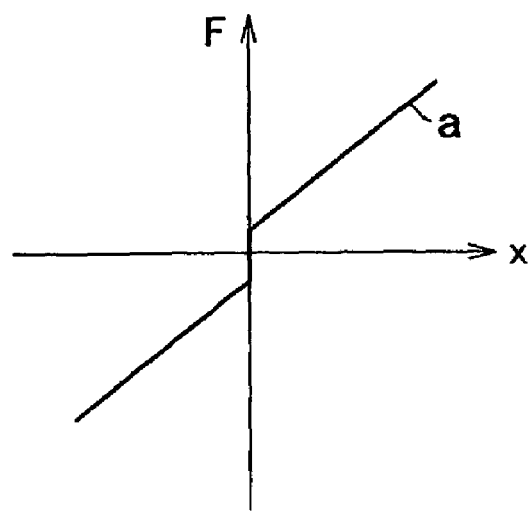
FIG. 16 is a graph showing the relationship between the displacement amount of the operating lever and the reaction force.
Figure 17:
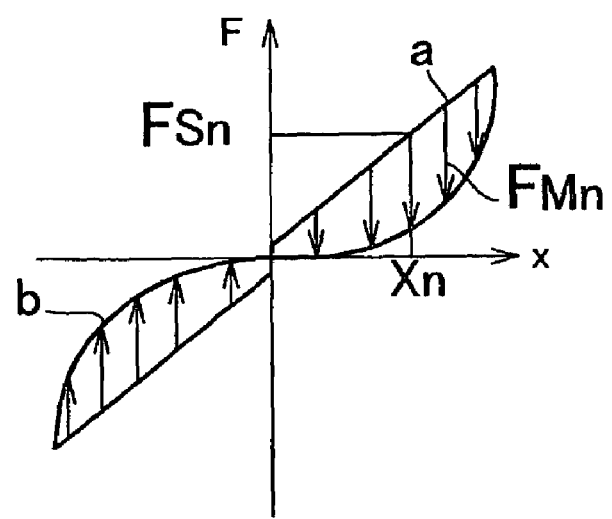
FIG. 17 is a graph showing a method for obtaining a target reaction force by adding or subtracting a correction amount to or from the reaction force shown in FIG. 16.

When the self-standing control of the operating lever 10 has ended, a reaction force based on the reaction force control shown in FIG. 9 is generated. The relationship between the position x of the operating lever 10 and the reaction force Fx of the operating lever 10, in this case, is such that the reaction force generated by driving the electric motors 25 and 35 and the reaction force generated by the elasticity of the torsion spring 60 are combined, as shown by line a in FIG. 16. In order to make this like the map in Step S406 in FIG. 9, a correction, shown in FIG. 17, is performed.

That is, this correction is done by adding or subtracting a correction value $FM_n$ to or from a reaction force $FS_n$ that corresponds to the position $x_n$ of the operating lever 10.

For example, if the operating lever 10 is positioned to the right of the neutral position in the left-right direction, the correction value $FM_n$ is subtracted from the reaction force $FS_n$. On the other hand, if the operating lever 10 is positioned to the left of the neutral position in the left-right direction, the correction value $FM_n$ is added to the reaction force $FS_n$. Accordingly, it is possible to obtain a curved line b indicative of the target reaction force Fx. That target reaction force Fx is controlled so as to become smaller the closer the operating lever 10 is to the neutral position and larger the farther away the operating lever 10 is from the neutral position. The relationship between the correction value $FM_n$ and the necessary current is determined as a specific characteristic of the motor. Also, after the self-standing control has ended, the vehicle can be steered based on the steering motor control shown in FIG. 10. According to this construction, the process for moving the operating lever 10 to the initial position becomes unnecessary, thereby simplifying the control. Moreover, problems that occur due to the operating lever 10 moving are all able to be solved.

When the self-standing control program shown in FIG. 4 is executed, the final target position X* is set corresponding to the displacement amount of the steering shaft 48. In this case as well, it is possible to perform the processes to be performed when the ignition switch is OFF, shown in FIG. 14, and set the displacement amount of the steering shaft 48 to "0" in advance. The final target position X* in this case becomes the neutral position of the operating lever 10, thus further simplifying the self-standing control.

Also according to the foregoing exemplary embodiment, the initial position of the operating lever 10 is made the neutral position. However, it is not limited to this. For example, the position corresponding to the steering angle of the wheels at the time electric power is supplied may be made the initial position of the operating lever 10. According to another exemplary embodiment of the invention, the operating lever 10 may be fixed by a pin or the like so that it does not move when the supply of electric power is interrupted, and the steering angle of the wheels may be made to correspond to the position of the operating lever 10.

Further, according to the forgoing exemplary embodiment, the operating member is constructed with an operating lever 10 constituted by a joy stick. However, this operating member is not limited to this but may also be constructed of a handle type. Also the foregoing exemplary embodiment is such that the return force that is less than the reaction force based on the position of the operating lever 10 is applied until the operating lever 10 reaches the initial position. However, it is not limited to this. For example, the moving speed of the operating lever 10 until it reaches the initial position may be detected, and the reaction force may be limited so that that speed becomes a speed which does not place a large load on the driver's hand.

Further, the foregoing exemplary embodiment discloses a device for operating a vehicle that generates a reaction force in accordance with the position of the operating lever 10. However, the invention is not limited to this. For example, the target steering angle may be calculated from the displacement position of the operating lever 10 and the reaction force may be generated from that target steering angle. The invention may also be applied to a vehicle in which the operating member for accelerating and braking and the operating member for steering are separate, and carried out for each of the operating members. The time that the electric power is interrupted in this case includes not only the point at which the electric power is interrupted, but also the period during which the electric power is interrupted.

What is claimed is:

1. A device for operating a vehicle, comprising:
an operating member to be operated by a driver;
a position detector that detects a displacement position of the operating member;
a reaction force generator that generates a return force that moves the operating member to an initial position when electric power is initially supplied upon vehicle start, and a reaction force against the operating member in accordance with the displacement position of the operating member; and
a reaction force control that independently controls (1) the return force in the period while the operating member is being moved to substantially the initial position, and (2) the reaction force at other times.

2. The device for operating a vehicle according to claim 1, wherein the reaction force control is provided for allowing generation of the reaction force by the reaction force generator after the operating member has substantially reached the initial position under the return force control.

3. The device for operating a vehicle according to claim 1, wherein the return force is controlled to be less than the reaction force.

4. A device for operating a vehicle, comprising:
an operating member to be operated by a driver;
a reaction force generator that generates a reaction force against the operating member; and
a reaction force generating controller that allows generation of the reaction force by the reaction force generator after the operating member has substantially reached an initial position, the reaction force being different than a return force that is generated by the reaction force generator while the operating member is being moved to substantially the initial position when electric power is initially supplied upon vehicle start.

5. A device for operating a vehicle, comprising:
an operating member to be operated by a driver;
a position detector that detects a displacement position of the operating member;
a reaction force generator that generates a reaction force against the operating member in accordance with the displacement position of the operating member detected by the position detector;
a determining device that determines whether the operating member is being moved to substantially an initial position when electric power is initially supplied upon vehicle start, and that changes a control mode of the reaction force generator in accordance with a determination result of the determining device.

6. A device for operating a vehicle, comprising:
an operating member to be operated by a driver;
a position detector that detects a displacement position of the operating member;
a reaction force generator that generates a reaction force against the operating member in accordance with the displacement position of the operating member detected by the position detector; and
a moving speed control device that controls a speed of movement of the operating member, caused by the generated reaction force, while the operating member is being moved to substantially an initial position when electric power is initially supplied upon vehicle start.

7. A method for operating a vehicle, comprising the steps of:
operating an operating member;
detecting a displacement position of the operating member; and
generating a return force that moves the operating member to substantially an initial position when electric power is initially supplied upon vehicle start, and a reaction force against the operating member in accordance with the displacement position of the operating member at other times, wherein the return force and the reaction force are individually controlled.

8. The method for operating a vehicle according to claim 7, wherein the reaction force is generated after the operating member has substantially reached an initial position.

9. The method for operating a vehicle according to claim 7, wherein the return force is controlled to be less than the reaction force.

10. A method for operating a vehicle, comprising the steps of:
operating an operating member;
generating a reaction force against the operating member; and
allowing generation of the reaction force after the operating member has substantially reached an initial position, wherein movement to the initial position occurs when electric power is initially supplied upon vehicle start.

11. A method for operating a vehicle, comprising the steps of:
operating an operating member;
detecting a displacement position of the operating member;
generating a reaction force against the operating member in accordance with the displacement position of the operating member;
determining whether the operating member is being moved to substantially an initial position when electric power is initially supplied upon vehicle start; and
changing a control mode of the reaction force in accordance with a determination result of the determining step.

12. A method for operating a vehicle, comprising the steps of:
operating an operating member;
detecting a displacement position of the operating member;
generating a reaction force against the operating member in accordance with the displacement position of the operating member; and
limiting a speed of movement of the operating member, caused by the reaction force, while the operating member is being moved to substantially an initial position when electric power is initially supplied upon vehicle start.

13. A method for operating a vehicle, comprising the steps of:
operating an operating member;
moving the operating member to substantially an initial position when electric power is initially supplied on vehicle start; and
generating a reaction force against the operating member, wherein the moving of the operating member to an initial position and the generating of the reaction force are controlled independently.

14. The method for operating a vehicle according to claim 13, wherein the reaction force is generated after the operating member has substantially reached an initial position.

* * * * *